US012643998B2

(12) United States Patent (10) Patent No.: US 12,643,998 B2

Kato (45) Date of Patent: Jun. 2, 2026

(54) RESIN COMPOSITION, STRETCHABLE FILM, SHEET AND TUBE

(71) Applicant: ZEON CORPORATION, Tokyo (JP)

(72) Inventor: Daisuke Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 521 days.

(21) Appl. No.: 18/246,852

(22) PCT Filed: Oct. 8, 2021

(86) PCT No.: PCT/JP2021/037373

§ 371 (c)(1),
(2) Date: Mar. 28, 2023

(87) PCT Pub. No.: WO2022/085492

PCT Pub. Date: Apr. 28, 2022

(65) Prior Publication Data

US 2023/0365795 A1 Nov. 16, 2023

(30) Foreign Application Priority Data

Oct. 19, 2020 (JP) ................................. 2020-175294

(51) Int. Cl.
*C08L 23/12* (2006.01)
*C08J 5/18* (2006.01)

(52) U.S. Cl.
CPC ................. *C08L 23/12* (2013.01); *C08J 5/18* (2013.01); *C08J 2323/12* (2013.01); *C08J 2453/02* (2013.01); *C08L 2203/16* (2013.01); *C08L 2203/18* (2013.01); *C08L 2205/025* (2013.01); *C08L 2205/03* (2013.01)

(58) Field of Classification Search
CPC ..... C08F 297/046; C08F 8/04; C08J 2323/12; C08J 2453/02; C08J 5/18; C08L 2203/16; C08L 2203/18; C08L 2205/025; C08L 2205/03; C08L 23/12; C08L 23/14; C08L 53/02; C08L 53/025
See application file for complete search history.

(56) References Cited

U.S. PATENT DOCUMENTS

| | | | |
|---|---|---|---|
| 3,333,024 A | 7/1967 | Haefele et al. | |
| 3,485,787 A | 12/1969 | Haefele et al. | |
| 4,501,857 A | 2/1985 | Kishimoto et al. | |
| 4,673,714 A | 6/1987 | Kishimoto et al. | |
| 2010/0239802 A1 | 9/2010 | Kuwahara et al. | |
| 2012/0088423 A1 | 4/2012 | Oda et al. | |
| 2019/0077947 A1 | 3/2019 | Nojima et al. | |
| 2019/0136040 A1 | 5/2019 | Ichino et al. | |

FOREIGN PATENT DOCUMENTS

| | | |
|---|---|---|
| CN | 101796131 A | 8/2010 |
| EP | 2186859 A1 | 5/2010 |
| GB | 1020720 A | 2/1966 |
| JP | S428704 B1 | 4/1967 |
| JP | S436636 B1 | 3/1968 |
| JP | S59133203 A | 7/1984 |
| JP | S60220147 A | 11/1985 |
| JP | 2000143889 A | 5/2000 |
| JP | 2006089546 A | 4/2006 |
| JP | 2010106200 A | 5/2010 |
| JP | 2017119756 A | 7/2017 |
| JP | 2020002296 A | 1/2020 |
| WO | 2009031625 A1 | 3/2009 |
| WO | 2017159800 A1 | 9/2017 |
| WO | 2017188190 A1 | 11/2017 |

OTHER PUBLICATIONS

Dec. 7, 2021, International Search Report issued in the International Patent Application No. PCT/JP2021/037373.
Apr. 13, 2023, International Preliminary Report on Patentability issued in the International Patent Application No. PCT/JP2021/037373.
Oct. 22, 2024, the Extended European Search Report issued by the European Patent Office in the corresponding European Patent Application No. 21882633.7.

*Primary Examiner* — Ana L. Woodward

(74) *Attorney, Agent, or Firm* — KENJA IP LAW PC

(57) ABSTRACT

Provided is a resin composition comprising a hydrogenated block copolymer composition comprising a hydrogenated block copolymer A represented by a specific General Formula (A) and a hydrogenated block copolymer B represented by a specific General Formula (B); and a polyolefin thermoplastic resin C, wherein the weight ratio of the hydrogenated block copolymer A to the hydrogenated block copolymer B is within a specific range, and the hydrogenation ratio of olefins in the polymer components constituting the hydrogenated block copolymer composition is within a specific range.

13 Claims, No Drawings

RESIN COMPOSITION, STRETCHABLE FILM, SHEET AND TUBE

TECHNICAL FIELD

The present invention relates to a resin composition, and more specifically to a resin composition that can provide a molded article ensuring both tensile stress and restoring force at high levels, as well as excellent impact resistance and excellent thermal stability.

BACKGROUND ART

Aromatic vinyl-conjugated diene-aromatic vinyl block copolymers, such as a styrene-isoprene-styrene block copolymer (SIS), a styrene-butadiene-styrene block copolymer (SBS), and the like, are thermoplastic elastomers having characteristic properties in various aspects, and therefore are used in various applications. Among thermoplastic elastomers, aromatic vinyl-conjugated diene-aromatic vinyl block copolymers have particularly high stretchability, and therefore are used as materials for films, sheets, tubes, and the like, for which stretchability is required.

As described above, a resin composition containing an aromatic vinyl-conjugated diene-aromatic vinyl block copolymer is used as a material for a molded article for which stretchability is required, in particular, for which both tensile stress and restoring force are required at the same time. However, when one of the tensile stress and the restoring force is increased, the other tends to decrease; that is, there is a trade-off between the tensile stress and the restoring force. Therefore, satisfying both the tensile stress and the restoring force has been in demand. In addition, in order to improve the durability or the like of a molded article, a resin composition that can improve the impact resistance and the thermal stability of a molded article to be obtained has been in demand.

For example, Patent Document 1 discloses a hydrogenated block copolymer comprising, in its molecule, a polymer block (C) having a conjugated diene compound as a main component, a polymer block (B) having a conjugated diene compound as a main component, and a polymer block (S) having an aromatic vinyl compound as a main component, wherein the polymer block (B) comprises polymer blocks (B1) and (B2); in the hydrogenated block copolymer, the content of the polymer block (C) is 1 to 20% by mass, the content of the polymer block (B) is 73 to 97% by mass, and the content of the polymer block (S) is 1 to 15% by mass; the amount of vinyl bond before hydrogenation of the polymer block (C) is 1 to 25 mol %, the amount of vinyl bond of the polymer block (B1) is 40 to 60 mol %, and the amount of vinyl bond of the polymer block (B2) is 60 to 100 mol %; and a degree of hydrogenation is 80 mol % or more. However, the technique of Patent Document 1 was incapable of ensuring both tensile stress and restoring force of the resulting molded article at high levels. In addition, in the technique of Patent Document 1, the impact resistance of the resulting molded article was insufficient, and improvement in the impact resistance has been sought.

RELATED ART DOCUMENTS

Patent Documents

Patent Document 1: WO 2017/188190

SUMMARY OF THE INVENTION

Problem to be Solved by the Invention

The present invention has been made in consideration of such circumstances, and an object of the present invention is to provide a resin composition that can provide a molded article ensuring both tensile stress and restoring force at high levels, as well as excellent impact resistance and excellent thermal stability.

Means for Solving the Problems

The present inventor, who has conducted research to achieve the above object, has found that a molded article ensuring both tensile stress and restoring force at high levels, as well as ensuring excellent impact resistance and excellent thermal stability, can be obtained from a resin composition comprising a hydrogenated block copolymer composition comprising a hydrogenated block copolymer A represented by a specific General Formula (A) and a hydrogenated block copolymer B represented by a specific General Formula (B); and a polyolefin thermoplastic resin C, wherein the weight ratio of the hydrogenated block copolymer A to the hydrogenated block copolymer B is within a specific range, and the hydrogenation ratio of olefins in the polymer components constituting the hydrogenated block copolymer composition is within a specific range. With this finding, the present inventor completed the present invention.

In other words, the present invention provides a resin composition comprising a hydrogenated block copolymer composition comprising a hydrogenated block copolymer A represented by General Formula (A) and a hydrogenated block copolymer B represented by General Formula (B); and a polyolefin thermoplastic resin C, wherein the weight ratio (A/B) of the hydrogenated block copolymer A to the hydrogenated block copolymer B in the hydrogenated block copolymer composition is 10/90 to 80/20, and the hydrogenation ratio of olefins in the polymer components constituting the hydrogenated block copolymer composition is 10 to 100%:

$$\text{Ar}1^{a}\text{-HD}^{a}\text{-Ar}2^{a} \tag{A}$$

$$\text{Ar}1^{b}\text{-HD}^{b}\text{-Ar}2^{b} \tag{B}$$

(wherein in General Formulae (A) and (B), $\text{Ar}1^{a}$, $\text{Ar}2^{a}$, $\text{Ar}1^{b}$, and $\text{Ar}2^{b}$ are each an aromatic vinyl polymer block, $\text{HD}^{a}$ and $\text{HD}^{b}$ are each a hydrogenated polymer block of a conjugated diene polymer, the ratio $(\text{Mw}(\text{Ar}2^{a})/\text{Mw}(\text{Ar}1^{a}))$ of the weight average molecular weight of Ar2a $(\text{Mw}(\text{Ar}2^{a}))$ to the weight average molecular weight of $\text{Ar}1^{a}$ $(\text{Mw}(\text{Ar}1^{a}))$ is 2.6 to 66, and the ratio $(\text{Mw}(\text{Ar}2^{b})/\text{Mw}(\text{Ar}1^{b}))$ of the weight average molecular weight of $\text{Ar}2^{b}$ $(\text{Mw}(\text{Ar}2^{b}))$ to the weight average molecular weight of $\text{Ar}1^{b}$ $(\text{Mw } (\text{Ar}1^{b}))$ is 0.95 to 1.05).

In the resin composition according to the present invention, the proportion of aromatic vinyl monomer units is preferably 20 to 70% by weight in the total repeating units of the polymer components in the hydrogenated block copolymer composition.

In the resin composition according to the present invention, $\text{HD}^{a}$ and $\text{HD}^{b}$ in General Formulae (A) and (B) above of the hydrogenated block copolymer composition each preferably have a vinyl bond content of 1 to 80 mol %.

In the resin composition according to the present invention, in General Formulae (A) and (B) above of the hydrogenated block copolymer composition, $\text{Ar}1^{a}$, $\text{Ar}1^{b}$, and $\text{Ar}2^{b}$ each preferably have a weight average molecular weight in the range of 2,000 to 40,000, and $HD^a$ and $HD^b$ each preferably have a weight average molecular weight in the range of 10,000 to 300,000.

In the resin composition according to the present invention, the weight ratio (C/A+B) of the content of the polyolefin thermoplastic resin C to the total content of the hydrogenated block copolymer A and the hydrogenated block copolymer B is preferably 10/90 to 90/10.

In the resin composition according to the present invention, the weight average molecular weight of the total polymer components constituting the hydrogenated block copolymer composition is preferably 30,000 to 400,000.

In the resin composition according to the present invention, the polyolefin thermoplastic resin C is preferably a polypropylene resin.

The present invention also provides a stretchable film, a sheet, and a tube famed from the resin composition according to any one of those defined above.

Effects of the Invention

The present invention provides a resin composition that can provide a molded article ensuring both tensile stress and restoring force at high levels, as well as excellent impact resistance and excellent thermal stability.

DESCRIPTION OF EMBODIMENTS

The resin composition according to the present invention is a resin composition comprising a hydrogenated block copolymer composition comprising a hydrogenated block copolymer A represented by General Formula (A) described later and a hydrogenated block copolymer B represented by General Formula (B) described later; and a polyolefin thermoplastic resin C, wherein the weight ratio (A/B) of the hydrogenated block copolymer A to the hydrogenated block copolymer B in the hydrogenated block copolymer composition is 10/90 to 80/20, and the hydrogenation ratio of olefins in the polymer components constituting the hydrogenated block copolymer composition is 10 to 100%.

The hydrogenated block copolymer composition used in the present invention comprises a hydrogenated block copolymer A represented by General Formula (A) below and a hydrogenated block copolymer B represented by General Formula (B) below.

$$Ar1^a\text{-}HD^a\text{-}Ar2^a \quad (A)$$

$$Ar1^b\text{-}HD^b\text{-}Ar2^b \quad (B)$$

In General Formula (A) above, $Ar1^a$ and $Ar2^a$ are each an aromatic vinyl polymer block, and the ratio $(Mw(Ar2^a)/Mw(Ar1^a))$ of the weight average molecular weight of $Ar2^a$ $(Mw(Ar2^a))$ to the weight average molecular weight of $Ar1^a$ $(Mw(Ar1^a))$ is 2.6 to 66. $HD^a$ is a hydrogenated polymer block of a conjugated diene polymer.

In General Formula (B) above, $Ar1^b$ and $Ar2^b$ are each an aromatic vinyl polymer block, and the ratio $(Mw(Ar2^b)/Mw(Ar1^b))$ of the weight average molecular weight of $Ar2^b$ $(Mw(Ar2^b))$ to the weight average molecular weight of $Ar1^b$ $(Mw(Ar1^b))$ is 0.95 to 1.05. $HD^b$ is a hydrogenated polymer block of a conjugated diene polymer.

Although not particularly limited, the hydrogenated block copolymer composition used in the present invention is preferably a composition comprising only the hydrogenated block copolymer A and the hydrogenated block copolymer B as polymer components.

The aromatic vinyl polymer blocks $Ar1^a$, $Ar2^a$, $Ar1^b$, and $Ar2^b$ of the hydrogenated block copolymer A and the hydrogenated block copolymer B are polymer blocks comprising aromatic vinyl monomer units.

The aromatic vinyl monomer used to form aromatic vinyl monomer units can be any aromatic vinyl compound without limitation. Examples of aromatic vinyl compounds include styrene; styrenes substituted by an alkyl group, such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; styrenes substituted by a halogen atom, such as 2-chlorostyrene, 3-chlorostyrene, 4-chlorostyrene, 4-bromostyrene, 2-methyl-4,6-dichlorostyrene, and 2,4-dibromostyrene; vinyl naphthalene; and the like. Among these, preferred is use of styrene. For each of the aromatic vinyl polymer blocks, these aromatic vinyl monomers can be used alone or in combination. For the aromatic vinyl polymer blocks, the same aromatic vinyl monomer may be used, or different aromatic vinyl monomers may be used. The content of the aromatic vinyl monomer units in each aromatic vinyl polymer block is preferably 80% by weight or more, more preferably 90% by weight or more, particularly preferably substantially 100% by weight in the total aromatic vinyl polymer blocks.

In the hydrogenated block copolymer A and the hydrogenated block copolymer B, the aromatic vinyl polymer blocks $Ar1^a$, $Ar2^a$, $Ar1^b$, and $Ar2^b$ may contain monomer units other than the aromatic vinyl monomer units. Examples of the monomer units other than the aromatic vinyl monomer units include conjugated diene monomers such as 1,3-butadiene and isoprene (2-methyl-1,3-butadiene); α,β-unsaturated nitrile monomers; unsaturated carboxylic acid monomers or acid anhydride monomers thereof; unsaturated carboxylic acid ester monomers; non-conjugated diene monomers; and the like.

The content of the monomer units other than the aromatic vinyl monomer units in each aromatic vinyl polymer block is preferably 20% by weight or less, more preferably 10% by weight or less, particularly preferably substantially 0% by weight in the total aromatic vinyl polymer blocks.

The hydrogenated polymer blocks $HD^a$ and $HD^b$ of the conjugated diene polymers in the hydrogenated block copolymer A and the hydrogenated block copolymer B, respectively, are polymer blocks comprising conjugated diene monomer units, where at least part of the conjugated diene monomer units in the polymer blocks is hydrogenated.

The conjugated diene monomer used to form the conjugated diene monomer units can be any conjugated diene compound. Examples of the conjugated diene compound include 1,3-butadiene, isoprene, 2,3-dimethyl-1,3-butadiene, 2-chloro-1,3-butadiene, 1,3-pentadiene, 1,3-hexadiene, and the like. Among these, preferred is use of 1,3-butadiene and/or isoprene, and particularly preferred is use of isoprene from the viewpoint of reactivity in polymerization reaction. For each of the hydrogenated polymer blocks, these conjugated diene monomers can be used alone or in combination. For the hydrogenated polymer blocks, the same conjugated diene monomer may be used, or different conjugated diene monomers can be used. The content of the conjugated diene monomer units (including hydrogenated conjugated diene monomer units) in each hydrogenated polymer block is preferably 80% by weight or more, more preferably 90% by weight or more, particularly preferably substantially 100% by weight in the total conjugated diene polymer blocks.

The hydrogenated polymer blocks $HD^a$ and $HD^b$ of the conjugated diene polymers in the hydrogenated block copolymer A and the hydrogenated block copolymer B, respectively, may contain monomer units other than the conjugated diene monomer units. Examples of monomers which can form the monomer units other than the conjugated diene monomer units include aromatic vinyl monomers such as styrene and α-methylstyrene; α,β-unsaturated nitrile monomers; unsaturated carboxylic acid monomers or acid anhydride monomers thereof; unsaturated carboxylic acid ester monomers; non-conjugated diene monomers; and the like.

The content of the monomer units other than the conjugated diene monomer units (including hydrogenated conjugated diene monomer units) in each hydrogenated polymer block is preferably 20% by weight or less, more preferably 10% by weight or less, particularly preferably substantially 0% by weight in the total conjugated diene polymer blocks.

With respect to the hydrogenated block copolymer A in the hydrogenated block copolymer composition, the ratio $(Mw(Ar2^a)/Mw(Ar1^a))$ of the weight average molecular weight of $Ar2^a$ $(Mw(Ar2^a))$ to the weight average molecular weight of $Ar1^a$ $(Mw(Ar1^a))$ is in the range of 2.6 to 66. This means that the hydrogenated block copolymer A is a hydride of an asymmetric aromatic vinyl-conjugated diene-aromatic vinyl block copolymer composed of a sequence of the aromatic vinyl polymer block $Ar1^a$ having a relatively small weight average molecular weight, the hydrogenated polymer block HL of the conjugated diene polymer, and the aromatic vinyl polymer block Ar2a having a relatively large weight average molecular weight in this order.

In the hydrogenated block copolymer A, $Mw(Ar2^a)/Mw(Ar1^a)$ is in the range of 2.6 to 66. When $Mw(Ar2^a)/Mw(Ar1^a)$ is excessively small or excessively large, it is difficult to ensure both of the tensile stress and the restoring force of the molded article to be obtained. From the viewpoint of impact resistance, $Mw(Ar2^a)/Mw(Ar1^a)$ is preferably in the range of 4 to 40, more preferably in the range of 4.5 to 35. In the present invention, the weight average molecular weight (Mw) or the number average molecular weight (Mn) of the polymer or the polymer block is determined as a value against polystyrene standards in the measurement by high performance liquid chromatography.

The weight average molecular weight $(Mw(Ar1^a))$ of the aromatic vinyl polymer block $Ar1^a$ having a relatively small weight average molecular weight, which is a constituent of the hydrogenated block copolymer A, is preferably 2,000 to 40,000, more preferably 2,500 to 30,000, further more preferably 3,000 to 10,000. With this range of $Mw(Ar1^a)$, both tensile stress and restoring force can be ensured at higher levels in the molded article to be obtained.

The weight average molecular weight $(Mw(Ar2^a))$ of the aromatic vinyl polymer block $Ar2^a$ having a relatively larger weight average molecular weight, which is a constituent of the hydrogenated block copolymer A, is preferably 5,000 to 250,000, more preferably 8,000 to 120,000, further more preferably 10,000 to 80,000. With this range of $Mw(Ar2^a)$, both tensile stress and restoring force can be ensured at higher levels in the molded article to be obtained.

The vinyl bond content (the proportion of 1,2-vinyl bonds and 3,4-vinyl bonds in the total conjugated diene monomer units) in the hydrogenated polymer block $HD^a$ of the conjugated diene polymer constituting the hydrogenated block copolymer A is preferably 1 to 80 mol %, more preferably 10 to 60 mol %, further preferably 20 to 40 mol %. With this range of vinyl bond content, the compatibility between the hydrogenated block copolymer A and the polyolefin thermoplastic resin C can be enhanced, and both tensile stress and restoring force can be ensured at higher levels in the molded article to be obtained. The vinyl bond content of the hydrogenated polymer block of the conjugated diene polymer can be determined by $^1$H-NMR using deuterochloroform as a solvent.

The weight average molecular weight $(Mw(HD^a))$ of the hydrogenated polymer block $HD^a$ of the conjugated diene polymer constituting the hydrogenated block copolymer A is preferably 10,000 to 300,000, more preferably 15,000 to 300,000, further preferably 15,000 to 150,000, particularly preferably 20,000 to 80,000.

Although not particularly limited, the content of the aromatic vinyl monomer units in the total monomer units in the hydrogenated block copolymer A is preferably 30 to 95% by weight, more preferably 35 to 90% by weight, further preferably 40 to 87% by weight, particularly preferably 43 to 85% by weight. The content of the aromatic vinyl monomer units in the total monomer units in the hydrogenated block copolymer A can be determined based on the ratio of intensities detected by the differential refractometer and the ultraviolet detector in the measurement by high performance liquid chromatography.

Although not particularly limited, the weight average molecular weight of the entire hydrogenated block copolymer A is preferably 20,000 to 500,000, more preferably 25,000 to 300,000, still more preferably 30,000 to 150,000.

The hydrogenated block copolymer B in the hydrogenated block copolymer composition is a hydride of an aromatic vinyl-conjugated diene-aromatic vinyl block copolymer composed of the conjugated diene polymer block $HD^b$ and two aromatic vinyl polymer blocks, i.e., $Ar1^b$ and $Ar2^b$ bonded to the two terminals of the conjugated diene polymer block $HD^b$, respectively. The weight average molecular weights $(Mw(Ar1^b), Mw(Ar2^b))$ of the two aromatic vinyl polymer blocks $Ar1^b$ and $Ar2^b$ constituting the hydrogenated block copolymer B are such that the ratio $Mw(Ar2^b)/Mw(Ar1^b))$ of the weight average molecular weight of $Ar2^b$ $(Mw(Ar2^b))$ to the weight average molecular weight of $Ar1^b$ $(Mw(Ar1^b))$ is 0.95 to 1.05.

The weight average molecular weights $(Mw(Ar1^b), Mw(Ar2^b))$ of the two aromatic vinyl polymer blocks $Ar1^b$ and $Ar2^b$ constituting the hydrogenated block copolymer B are each preferably 2,000 to 40,000, more preferably 2,500 to 30,000, further preferably 3,000 to 10,000. With these ranges of $Mw(Ar1^b)$ and $Mw(Ar2^b)$, both tensile stress and restoring force can be ensured at higher levels in the molded article to be obtained. The weight average molecular weights $(Mw(Ar1^b), Mw(Ar2^b))$ of the two aromatic vinyl polymer blocks $Ar1^b$ and $Ar2^b$ may be equal or may be different. Preferably, their weight average molecular weights are substantially equal. For example, although what is needed is that the ratio $Mw(Ar2^b)/Mw(Ar1^b))$ of the weight average molecular weight $(Mw(Ar2^b))$ of $Ar2^b$ to the weight average molecular weight $(Mw(Ar1^b))$ of $Ar1^b$ is within the range of 0.95 to 1.05, the ratio $Mw(Ar2^b)/Mw(Ar1^b))$ is preferably in the range of 0.97 to 1.03.

In addition, the weight average molecular weight $(Mw(Ar1^b), Mw(Ar2^b))$ of at least one of these two aromatic vinyl polymer blocks $Ar1^b$ and $Ar2^b$ may be equal or different, but is preferably substantially equal, to the weight average molecular weight $(Mw(Ar1^a))$ of the aromatic vinyl polymer block $Ar1^a$ having a relatively small weight average molecular weight, which is a constituent of the hydrogenated block copolymer A. For example, the ratio $Mw(Ar1^b)/Mw(Ar1^a))$ of the weight average molecular weight $(Mw(Ar1^b))$ of $Ar1^b$ to the weight average molecular weight $(Mw(Ar1^a))$ of $Ar1^a$ may be in the range of 0.9 to 2.2, or the ratio $Mw(Ar2^b)/Mw(Ar1^a))$ of the weight average molecular weight $(Mw(Ar2^b))$ of $Ar2^b$ to the weight average molecular weight $(Mw(Ar1^a))$ of $Ar1^a$ may be in the range of 0.9 to 2.2. Further, for example, preferably, the ratio $Mw(Ar1^b)/Mw(Ar1^a))$ of the weight average molecular weight $(Mw(Ar1^b))$ of $Ar1^b$ to the weight average molecular weight $(Mw(Ar1^a))$ of $Ar1^a$ is in the range of 0.95 to 1.05, or the ratio $Mw(Ar2^b)/Mw(Ar1^a))$ of the weight average molecular weight $(Mw(Ar2^b))$ of $Ar2^b$ to the weight average molecular weight $(Mw(Ar1^a))$ of $Ar1^a$ is in the range of 0.95 to 1.05.

The vinyl bond content (the proportion of 1,2-vinyl bonds and 3,4-vinyl bonds in the total conjugated diene monomer units) in the hydrogenated polymer block $HD^b$ of the conjugated diene polymer constituting the hydrogenated block copolymer B is preferably 1 to 80 mol %, more preferably 10 to 60 mol %, further preferably 20 to 40 mol %. With this range of vinyl bond content, the compatibility between the hydrogenated block copolymer B and the polyolefin thermoplastic resin C can be enhanced, and both tensile stress and restoring force can be ensured at higher levels in the molded article to be obtained. The vinyl bond content of the hydrogenated polymer block of the conjugated diene polymer can be determined by $^1$H-NMR using deuterochloroform as a solvent. Preferably, the vinyl bond content of the hydrogenated polymer block $HD^b$ of the conjugated diene polymer constituting the hydrogenated block copolymer B is substantially equal to the vinyl bond content of the hydrogenated polymer block I-Da of the conjugated diene polymer constituting the hydrogenated block copolymer A. For example, the ratio of the vinyl bond content of the hydrogenated polymer block $HD^b$ of the conjugated diene polymer constituting the hydrogenated block copolymer B to the vinyl bond content of the hydrogenated polymer block $HD^a$ of the conjugated diene polymer constituting the hydrogenated block copolymer A is preferably in the range of 0.95 to 1.05.

If the hydrogenated block copolymer composition used in the present invention is produced by a production method using a coupling agent, such as a method for producing the hydrogenated block copolymer composition, comprising steps (1a) to (6a) described later, the hydrogenated polymer block $HD^b$ of the conjugated diene polymer constituting the hydrogenated block copolymer B may contain a residue of the coupling agent. Specifically, the hydrogenated block copolymer B may be a compound represented by the following formula:

$$Ar1^b\text{-}(HD^{b'}\text{-}X\text{-}HD^{b''})\text{-}Ar2^b$$

Namely, according to an embodiment, as shown in the above formula, the hydrogenated polymer block $HD^b$ of the conjugated diene polymer may be composed of $HD^{b'}$ and $HD^{b''}$ coupled via the residue X of the coupling agent. Examples of the residue X of the coupling agent include residues of bifunctional coupling agents exemplified in the method for producing the hydrogenated block copolymer composition described later, which comprises the steps (1a) to (6a).

The weight average molecular weight $(Mw(HD^b))$ of the hydrogenated polymer block $HD^b$ of the conjugated diene polymer constituting the hydrogenated block copolymer B is preferably 10,000 to 300,000, more preferably 15,000 to 300,000, further preferably 15,000 to 150,000, particularly preferably 20,000 to 80,000.

Although not particularly limited, the content of the aromatic vinyl monomer units in the total monomer units in the hydrogenated block copolymer B is preferably 10 to 35% by weight, more preferably 12 to 32% by weight, further preferably 15 to 30% by weight. The content of the aromatic vinyl monomer units in the total monomer units in the hydrogenated block copolymer A can be determined based on the ratio of intensities detected by the differential refractometer and the ultraviolet detector in the measurement by high performance liquid chromatography.

Although not particularly limited, the weight average molecular weight of the entire hydrogenated block copolymer B is preferably 20,000 to 200,000, more preferably 25,000 to 150,000, still more preferably 30,000 to 70,000.

Although not particularly limited, the hydrogenated block copolymer A and the hydrogenated block copolymer B constituting the hydrogenated block copolymer composition used in the present invention and the polymer blocks constituting these block copolymers each have a molecular weight distribution of preferably 1.1 or less, more preferably 1.05 or less, the molecular weight distribution being represented by the ratio $[(Mw)/(Mn)]$ of the weight average molecular weight (Mw) to the number average molecular weight (Mn).

The weight ratio (A/B) of the hydrogenated block copolymer A to the hydrogenated block copolymer B contained in the hydrogenated block copolymer composition used in the present invention is 10/90 to 80/20. When the weight ratio (A/B) is excessively small or excessively large, it is difficult to ensure both of high elastic modulus and small permanent elongation. The weight ratio (A/B) is preferably 12/88 to 60/40, more preferably 15/85 to 50/50. With this ratio of the content of the hydrogenated block copolymer A to the content of the hydrogenated block copolymer B, both tensile stress and restoring force can be ensured at higher levels in the molded article to be obtained. The weight ratio (A/B) of the hydrogenated block copolymer A to the hydrogenated block copolymer B can be determined from the ratio of the areas of the peaks corresponding to the respective block copolymers in a chart obtained by high performance liquid chromatography.

In the hydrogenated block copolymer composition used in the present invention, the hydrogenation ratio of olefins in the polymer components constituting the hydrogenated block copolymer composition is in the range of 10 to 100%. Here, the hydrogenation ratio of olefins indicates the hydrogenation ratio of olefins in the total polymer components constituting the hydrogenated block copolymer composition, and specifically is the proportion (mol %) of hydrogenated ones of the total non-aromatic carbon-carbon double bonds contained in the polymer components before hydrogenation. The present inventor, who has conducted extensive research, has found that a resin composition comprising, as a hydrogenated block copolymer composition, the hydrogenated block copolymer A represented by General Formula (A) and the hydrogenated block copolymer B represented by General Formula (B) in a specific weight proportion and having the above range of hydrogenation ratio of olefins in the hydrogenated block copolymer composition can ensure both high elastic modulus and small permanent elongation at high levels, as well as excellent thermal stability and excellent impact resistance.

The hydrogenation ratio of olefins in the polymer components constituting the hydrogenated block copolymer composition used in the present invention is in the range of 10 to 100%. An excessively low hydrogenation ratio of olefins results in insufficient thermal stability of the resin composition. The hydrogenation ratio of olefins is preferably 30 to 100%, more preferably 70 to 100%, further preferably 90 to 100%. With the hydrogenation ratio of olefins within the above range, the thermal stability can be further enhanced while maintaining excellent tensile stress, excellent restoring force, and excellent impact resistance of the molded article to be obtained. The hydrogenation ratio of olefins can be determined by $^1$H-NMR spectrum measurement using deuterochloroform as a solvent.

Although it is sufficient that the hydrogenation ratio of olefins is within the above range in the hydrogenated block copolymer composition used in the present invention, each of the polymer components constituting the hydrogenated block copolymer composition has an iodine value within the range of preferably 0 to 300 gI$_2$/100 g, more preferably 0 to 150 gI$_2$/100 g, further preferably 0 to 125 gI$_2$/100 g, further more preferably 0 to 100 gI$_2$/100 g, particularly preferably 0 to 75 gI$_2$/100 g, most preferably 0 to 30 gI$_2$/100 g. With this range of iodine value, the thermal stability can be further enhanced while maintaining excellent tensile stress, excellent restoring force, and excellent impact resistance of the molded article to be obtained. The iodine value can be determined based on JIS K0070.

In the hydrogenated block copolymer composition used in the present invention, the proportion of the aromatic vinyl monomer units in the total polymer components in the hydrogenated block copolymer composition (the total monomer units constituting the polymer components) (hereinafter, referred to as "the content of the total aromatic vinyl monomer units" in some cases) is preferably 20 to 70% by weight, more preferably 25 to 60% by weight, further preferably 30 to 50% by weight. With this range of content of the total aromatic vinyl monomer units, both tensile stress and restoring force can be ensured at higher levels in the molded article to be obtained. The content of the total aromatic vinyl monomer units can be easily adjusted by adjusting the amounts of the hydrogenated block copolymer A, the hydrogenated block copolymer B, and the polymer component other than these which constitute the hydrogenated block copolymer composition in consideration of the contents of aromatic vinyl monomer units therein. The content of the total aromatic vinyl monomer units can be determined by $^1$H-NMR measurement using deuterochloroform as a solvent.

If all the polymer components constituting the hydrogenated block copolymer composition are composed of only aromatic vinyl monomer units and conjugated diene monomer units, only the aromatic vinyl monomer units can be extracted according to the method described in Rubber Chem. Technol., 45, 1295 (1972) by subjecting the polymer components in the hydrogenated block copolymer composition to ozone decomposition, followed by reduction with lithium aluminum hydride to decompose the conjugated diene monomer units (including the hydrogenated ones). Thus, the content of the total aromatic vinyl monomer units can be readily measured. Using a similar method, the content of the aromatic vinyl monomer units and the content of the conjugated diene monomer units in each block copolymer can be determined.

Although not particularly limited, the weight average molecular weight of the total polymer components constituting the hydrogenated block copolymer composition used in the present invention is preferably 30,000 to 400,000, more preferably 35,000 to 100,000, further preferably 40,000 to 80,000.

Further, although not particularly limited, the molecular weight distribution represented by the ratio (Mw/Mn) of the weight average molecular weight (Mw) to the number average molecular weight (Mn) of the total polymer components constituting the hydrogenated block copolymer composition used in the present invention is preferably 1.01 to 10, more preferably 1.02 to 5, further preferably 1.03 to 3.

The melt index of the hydrogenated block copolymer composition used in the present invention is preferably 0.1 to 150 g/10 min, more preferably 3 to 100 g/10 min, and further preferably 5 to 50 g/10 min. The melt index of the hydrogenated block copolymer composition can be measured according to ASTM D-1238 (Condition G, 200° C., 5 kg).

The hydrogenated block copolymer composition used in the present invention can be produced by any method; for example, the hydrogenated block copolymer composition can be produced according to a traditional method for producing a block copolymer and a traditional hydrogenation method by separately preparing the hydrogenated block copolymer A and the hydrogenated block copolymer B, optionally compounding an additional polymer component and a variety of additives, and mixing these by a normal method such as kneading or solution mixing. On the other hand, in the present invention, the method described below is suitable because the hydrogenated block copolymer composition can be produced with high productivity.

In other words, the method for producing the hydrogenated block copolymer composition used in the present invention preferably comprises steps (1) to (7) of:

(1): preparing a solution containing a terminally active aromatic vinyl polymer by polymerizing an aromatic vinyl monomer in a solvent in the presence of a polymerization initiator;

(2): preparing a solution containing a terminally active aromatic vinyl-conjugated diene block copolymer by adding a conjugated diene monomer to the solution containing a terminally active aromatic vinyl polymer prepared in the step (1), and polymerizing the conjugated diene monomer;

(3): preparing a solution containing a terminally active aromatic vinyl-conjugated diene-aromatic vinyl block copolymer by adding an aromatic vinyl monomer to the solution containing a terminally active aromatic vinyl-conjugated diene block copolymer prepared in the step (2), and polymerizing the aromatic vinyl monomer;

(4): preparing a solution containing a block copolymer B' by adding a polymerization terminator to the solution containing a terminally active aromatic vinyl-conjugated diene-aromatic vinyl block copolymer, which is prepared in the step (3), in an amount of less than 1 molar equivalent relative to the active terminal of the terminally active aromatic vinyl-conjugated diene-aromatic vinyl block copolymer to deactivate a portion of the active terminal;

(5): preparing a solution containing the block copolymer B' and a block copolymer A' by adding an aromatic vinyl monomer to the solution containing the block copolymer B' prepared in the step (4), and polymerizing the aromatic vinyl monomer;

(6): preparing a solution containing a hydrogenated block copolymer B and a hydrogenated block copolymer A by hydrogenating the solution containing the block copolymer B' and the block copolymer A' prepared in the step (5); and (7): recovering a hydrogenated block copolymer composition from the solution containing the hydrogenated block copolymer B and the hydrogenated block copolymer A prepared in the step (6).

<Step (1)>

In this method for producing a hydrogenated block copolymer composition, first, in the step (1), a solution containing a terminally active aromatic vinyl polymer is prepared by polymerizing an aromatic vinyl monomer in a solvent in the presence of a polymerization initiator.

As the polymerization initiator, a polymerization initiator known to have anionic polymerization activity to aromatic vinyl monomers and conjugated diene monomers can be used. Examples of the polymerization initiator include organic alkali metal compounds, organic alkaline earth compounds, organic lanthanoid rare earth metal compounds, and the like.

For the organic alkali metal compounds, particularly suitably used are organic lithium compounds having one or more lithium atoms in the molecule. Specific examples of the organic alkali metal compounds include organic mono-lithium compounds such as ethyllithium, n-propyllithium, isopropyllithium, n-butyllithium, sec-butyllithium, t-butyl-lithium, hexyllithium, phenyllithium, stilbenelithium, dial-kylaminolithium compounds, diphenylaminolithium, and ditrimethylsilylaminolithium; organic dilithium compounds such as methylenedilithium, tetramethylenedilithium, hex-amethylenedilithium, isoprenyldilithium, and 1,4-dilithio-ethylcyclohexane; organic trilithium compounds such as 1,3,5-trilithiobenzene; and the like. Among these, organic monolithium compounds are particularly suitably used.

Examples of the organic alkaline earth metal compounds include n-butylmagnesium bromide, n-hexylmagnesium bromide, ethoxycalcium, calcium stearate, t-butoxystron-tium, ethoxybarium, isopropoxybarium, ethylmercapto-barium, t-butoxybarium, phenoxybarium, diethylamino-barium, barium stearate, ethylbarium, and the like.

Besides, those which form a homogeneous system in an organic solvent to have living polymerizability can also be used, for example, composite catalysts composed of lantha-noid rare earth metal compounds (including neodymium, samarium, gadolinium, and the like)/alkylaluminum/alkyl-aluminum halide/alkylaluminum hydride, or metallocene catalysts containing titanium, vanadium, samarium, gado-linium, or the like.

These polymerization initiators may be used alone or in combination as a mixture. The amount of the polymerization initiator to be used may be determined according to the target molecular weight of each block copolymer and is not particularly limited. The amount thereof is preferably 0.01 to 20 mmol, more preferably 0.05 to 15 mmol, still more preferably 0.1 to 10 mmol per 100 g of the total monomers to be used in polymerization.

The solvent used in polymerization can be any solvent inactive to the polymerization initiator and is not particularly limited. Examples thereof include linear hydrocarbon sol-vents, cyclic hydrocarbon solvents, a mixed solvent thereof, and the like. Examples of the linear hydrocarbon solvents include $C_4$ to $C_6$ linear alkanes and alkenes such as n-butane, isobutane, 1-butene, isobutylene, trans-2-butene, cis-2-butene, 1-pentene, trans-2-pentene, cis-2-pentene, n-pen-tane, isopentane, neo-pentane, and n-hexane; and the like. Examples of the cyclic hydrocarbon solvents include aro-matic compounds such as benzene, toluene, and xylene; alicyclic hydrocarbon compounds such as cyclopentane and cyclohexane; and the like. These solvents may be used alone or in combination as a mixture.

Although not particularly limited, the amount of the solvent to be used is set such that the content of the total block copolymers in the solution after the polymerization reaction is preferably 5 to 60% by weight, more preferably 10 to 55% by weight, still more preferably 20 to 50% by weight.

During production of the hydrogenated block copolymer composition, a Lewis base compound may be added to the reaction system to control the structures of the polymer blocks in each of the block copolymers. Examples of the Lewis base compound include ethers such as tetrahydro-furan, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, trieth-ylamine, pyridine, and quinuclidine; alkali metal alkoxides such as potassium t-amyloxide and potassium t-butyloxide; phosphines such as triphenylphosphine; and the like. These Lewis base compounds may be used alone or in combination as a mixture.

During the production of the hydrogenated block copo-lymer composition, the Lewis base compound can be added at any timing, which may be appropriately determined according to the structures of the block copolymers. For example, the Lewis base compound may be preliminarily added before polymerization is started, or may be added after the polymer blocks are partially polymerized. Further-more, the Lewis base compound may be preliminarily added before polymerization is started, and may be further added after the polymer blocks are partially polymerized.

The polymerization reaction temperature is preferably 10 to 150° C., more preferably 30 to 130° C., still more preferably 40 to 90° C., and the polymerization time is preferably 48 hours or less, more preferably 0.5 to 10 hours. The polymerization pressure is not particularly limited as long as it is controlled within the range of pressure enough to maintain the monomers and the solvent in a liquid phase at a polymerization temperature.

The solution containing a terminally active aromatic vinyl polymer can be prepared by polymerizing the aromatic vinyl monomer in the solvent in the presence of the polymeriza-tion initiator under such conditions. Thus, the terminally active aromatic vinyl polymer prepared in the step (1) constitutes the aromatic vinyl polymer block $Ar1^a$ having a relatively small weight average molecular weight for the hydrogenated block copolymer A and any one of the aro-matic vinyl polymer blocks $Ar1^b$ and $Ar2^b$ (i.e., $Ar1^b$ or Ar2b) for the hydrogenated block copolymer B, the hydro-genated block copolymer A and the hydrogenated block copolymer B constituting the hydrogenated block copoly-mer composition. For this reason, the polymerization con-ditions in the step (1) including the amount of the aromatic vinyl monomer may be determined according to the target weight average molecular weights of these polymer blocks.

<Step (2)>

Then, in the step (2), a solution containing a terminally active aromatic vinyl-conjugated diene block copolymer is prepared by adding a conjugated diene monomer to the solution containing a terminally active aromatic vinyl poly-mer prepared in the step (1), and polymerizing the conju-gated diene monomer.

In the step (2), as a result of addition of the conjugated diene monomer to the solution containing a terminally active aromatic vinyl polymer prepared in the step (1), a conju-gated diene polymer chain is famed from the active terminal, thereby preparing the solution containing a terminally active aromatic vinyl-conjugated diene block copolymer.

The conjugated diene polymer chain famed in the step (2) (conjugated diene block constituting the terminally active aromatic vinyl-conjugated diene block copolymer prepared in the step (2)) will form the hydrogenated polymer block $HD^a$ of the conjugated diene polymer in the hydrogenated block copolymer A and the hydrogenated polymer block $HD^b$ of the conjugated diene polymer in the hydrogenated block copolymer B. For this reason, the polymerization conditions in the step (2) including the amount of the conjugated diene polymer may be determined according to the target weight average molecular weights of these polymer blocks, and the like (for example, the polymerization conditions may be determined in the ranges described in the step (1)).

<Step (3)>

Then, in the step (3), a solution containing a terminally active aromatic vinyl-conjugated diene-aromatic vinyl block copolymer is prepared by adding an aromatic vinyl monomer to the solution containing a terminally active aromatic vinyl-conjugated diene block copolymer prepared in the step (2), and polymerizing the aromatic vinyl monomer.

In the step (3), as a result of addition of the aromatic vinyl monomer to the solution containing a terminally active aromatic vinyl-conjugated diene block copolymer prepared in the step (2), an aromatic vinyl polymer chain is famed from the active terminal, thereby preparing the solution containing a terminally active aromatic vinyl-conjugated diene-aromatic vinyl block copolymer.

The aromatic vinyl polymer chain famed in the step (3) (aromatic vinyl block in the terminally active aromatic vinyl-conjugated diene-aromatic vinyl block copolymer prepared in the step (3)) will form one of the aromatic vinyl polymer blocks $Ar1^b$ and $Ar2^b$ for the hydrogenated block copolymer B (i.e., $Ar1^b$ or $Ar2^b$ which is a block different from that famed in the step (1), for example, if the polymer chain forms $Ar1^b$ in the step (1), $Ar2^b$ is the corresponding block). For this reason, the polymerization conditions in the step (3) including the amount of the aromatic vinyl monomer may be determined according to the target weight average molecular weight of such a polymer block (for example, the polymerization conditions may be determined in the ranges described in the step (1)).

<Step (4)>

Then, in the step (4), a solution containing a block copolymer B' is prepared by adding a polymerization terminator to the solution containing a terminally active aromatic vinyl-conjugated diene-aromatic vinyl block copolymer, which is prepared in the step (3), in an amount of less than 1 molar equivalent relative to the active terminal of the terminally active aromatic vinyl-conjugated diene-aromatic vinyl block copolymer to deactivate a portion of the active terminal.

The block copolymer B' prepared in the step (4) is a block copolymer before hydrogenation for preparing the hydrogenated block copolymer B.

The polymerization terminator can be any compound which can react with the active terminal to deactivate the active terminal and to be no longer reactive with other active terminals after having reacted with one active terminal, and preferred polymerization terminators are compounds not containing a halogen atom. Among these, particularly preferred are those which generate a metal alkoxide, a metal aryloxide, or a metal hydroxide when reacting with the active terminals. Specific examples of the polymerization terminator include water; monohydric alcohols such as methanol and ethanol; monohydric phenols such as phenol and cresol; and the like.

The amount of the polymerization terminator to be used may be determined according to the proportions of the hydrogenated block copolymer A and the hydrogenated block copolymer B constituting the hydrogenated block copolymer composition, and is not particularly limited as long as it is less than 1 molar equivalent relative to the active terminal of the polymer. The amount of the polymerization terminator to be used is in the range of preferably 0.18 to 0.91 molar equivalents, more preferably 0.35 to 0.80 molar equivalents relative to the active terminal of the polymer.

Thus, in the step (4), as a result of addition of the polymerization terminator to the solution containing a terminally active aromatic vinyl-conjugated diene-aromatic vinyl block copolymer in an amount of less than 1 molar equivalent relative to the active terminal thereof, a portion of the active terminal of the terminally active aromatic vinyl-conjugated diene-aromatic vinyl block copolymer is deactivated, and thus, the copolymer having the deactivated active terminal corresponds to the block copolymer B' before hydrogenation for forming the hydrogenated block copolymer B. The residual terminally active aromatic vinyl-conjugated diene-aromatic vinyl block copolymer without reacting with the polymerization terminator is left unreacted in the solution while it maintains the active terminal.

<Step (5)>

Then, in the step (5), a solution containing the block copolymer B' and a block copolymer A' is prepared by adding an aromatic vinyl monomer to the solution containing a block copolymer B' prepared in the step (4) and polymerizing the aromatic vinyl monomer.

In the step (5), after the aromatic vinyl monomer is added to the solution prepared in the step (4), the aromatic vinyl monomer is further polymerized to extend the aromatic vinyl polymer chain having the active terminal in the residual terminally active aromatic vinyl-conjugated diene-aromatic vinyl block copolymer without reacting with the polymerization terminator. Thereby, the block copolymer A' is prepared. The block copolymer A' is an aromatic vinyl-conjugated diene-aromatic vinyl block copolymer prepared through extension of the aromatic vinyl polymer chain, and will form a block copolymer before hydrogenation for preparing the hydrogenated block copolymer A.

At this time, the aromatic vinyl polymer chain extended in the step (5) will form the aromatic vinyl polymer block $Ar2^a$ having a relatively large weight average molecular weight in the hydrogenated block copolymer A in the hydrogenated block copolymer composition. For this reason, the polymerization conditions in the step (5) including the amount of the aromatic vinyl monomer may be determined according to the target weight average molecular weight of such an aromatic vinyl polymer block $Ar2^a$ (for example, the polymerization conditions may be determined in the ranges described in the step (1)).

<Step (6)>

Then, in the step (6), a solution containing a hydrogenated block copolymer B and a hydrogenated block copolymer A is prepared by hydrogenating the solution containing the block copolymer B' and a block copolymer A' prepared in the step (5).

The solution containing the block copolymer B' and a block copolymer A' can be hydrogenated by any method. Examples thereof include a method of bringing the solution containing the block copolymer B' and a block copolymer A' into contact with hydrogen in the presence of a hydrogenation catalyst, and the like.

Examples of the hydrogenation catalyst include, but should not be limited to, Ziegler catalysts such as heterogeneous supported catalysts composed of a metal such as Ni, Pt, Pd, or Ru supported on a carrier such as carbon, silica, alumina, or diatomite in combination with reducing agents such as an organic or acetylacetone salt of Ni, Co, Fe, or Cr and organic Al; organic complex catalysts such as organic metal compounds of Ru, Rh, and the like; homogeneous catalysts such as a titanocene compound in combination with organic Li, organic Al, or organic Mg as a reducing agent; and the like. Among these, Ziegler catalysts are preferred.

Hydrogenation can be performed according to the methods disclosed in JP S42-8704 B, JP S43-6636 B, JP S59-133203 A, JP S60-220147 A, and the like.

Although the conditions for the hydrogenation may be selected according to the hydrogenation ratio of olefins in the polymer components constituting the hydrogenated block copolymer composition, the hydrogenation temperature is preferably 0 to 200° C., more preferably 30 to 150° C. The pressure of hydrogen used in the hydrogenation is preferably 0.1 to 15 MPa, more preferably 0.2 to 10 MPa, still more preferably 0.3 to 5 MPa, and the hydrogenation time is preferably 3 minutes to 10 hours, more preferably 10 minutes to 5 hours. The hydrogenation may be a batch process, a continuous process, or a combination thereof.

<Step (7)>

Then, in the step (7), the target hydrogenated block copolymer composition is recovered from the solution containing a hydrogenated block copolymer B and a hydrogenated block copolymer A prepared in the step (6).

The recovery may be performed according to a normal method, and the method for recovery is not particularly limited. For example, after the reaction is completed, a polymerization terminator is optionally added to deactivate the active terminal of the terminally active polymer, and further, additives such as an antioxidant are optionally added; thereafter, the solution is treated by a known solvent method such as direct drying or steam stripping. Thereby, the target hydrogenated block copolymer composition can be recovered. In this step, the polymerization terminator described above can be used.

If the hydrogenated block copolymer composition is recovered as a slurry by steam stripping or the like, preferably, the slurry is dehydrated using any dehydrating machine such as an extruder squeezer, and the hydrogenated block copolymer composition in the form of crumbs is recovered. Preferably, the recovered crumbs are dried using any dryer such as a band dryer or an expansion extrusion dryer. The hydrogenated block copolymer composition prepared as above may be processed into pellets or the like according to a normal method before use.

It is preferred that the hydrogenated block copolymer composition in the form of solids (pellets, crumbs, or the like) be used after the water content in the hydrogenated block copolymer composition in the form of solids is reduced using a dryer such as a hopper dryer, a hot air circulating shelf-type dryer, a shelf-type vacuum dryer, or a stirring vacuum dryer. The drying conditions at this time are not particularly limited as long as the target water content can be reached, and may be set according to the water content to be reduced and the type of the dryer. Usually, the drying temperature is set in the range of 40 to 90° C. and the drying time is set in the range of 1 to 24 hours.

The method for producing the hydrogenated block copolymer composition described above can provide a target hydrogenated block copolymer composition with productivity higher than that in the case where hydrogenated block copolymers are separately prepared and mixed, because the hydrogenated block copolymer A and the hydrogenated block copolymer B can be continuously prepared in the same reaction vessel.

During production of the hydrogenated block copolymer composition according to the present invention, the above-described suitable production method (the production method comprising the steps (1) to (7)) may be replaced by a method for producing a hydrogenated block copolymer composition, which comprises steps (1a) to (6a) of:

(1a): preparing a solution containing a terminally active aromatic vinyl polymer by polymerizing an aromatic vinyl monomer in a solvent in the presence of a polymerization initiator;

(2a): preparing a solution containing a terminally active aromatic vinyl-conjugated diene block copolymer by adding a conjugated diene monomer to the solution containing a terminally active aromatic vinyl polymer prepared in the step (1a), and polymerizing the conjugated diene monomer;

(3a): preparing a solution containing a block copolymer B' by adding a bifunctional coupling agent to the solution containing a terminally active aromatic vinyl-conjugated diene block copolymer, which is prepared in the step (2a), in an amount such that the total amount of the functional groups is less than 1 molar equivalent relative to the active terminal thereof, to couple a portion of the terminally active aromatic vinyl-conjugated diene block copolymer;

(4a): preparing a solution containing the block copolymer B' and a block copolymer A' by adding an aromatic vinyl monomer to the solution containing the block copolymer B' prepared in the step (3a), and polymerizing the aromatic vinyl monomer;

(5a): preparing a solution containing a hydrogenated block copolymer B and a hydrogenated block copolymer A by hydrogenating the solution containing the block copolymer B' and a block copolymer A' prepared in the step (4a); and (6a): recovering a hydrogenated block copolymer composition from the solution containing a hydrogenated block copolymer B and a hydrogenated block copolymer A prepared in the step (5a).

<Steps (1a) and (2a)>

The steps (1a) and (2a) are the same as the steps (1) and (2), and the same conditions can be used.

<Step (3a)>

In the step (3a), a solution containing a block copolymer B' is prepared by adding a bifunctional coupling agent to the solution containing a terminally active aromatic vinyl-conjugated diene block copolymer, which is prepared in the step (2a), in an amount such that the total amount of the functional groups is less than 1 molar equivalent relative to the active terminal thereof, to couple a portion of the terminally active aromatic vinyl-conjugated diene block copolymer.

The block copolymer B' prepared in the step (3a) will form a block copolymer before hydrogenation for forming the hydrogenated block copolymer B.

The bifunctional coupling agent may be any compound having two functional groups reactive with the active terminal, and examples thereof include, but should not be limited to, bifunctional halogenated silanes such as dichlorosilane, monomethyldichlorosilane, and dimethyldichlorosilane; bifunctional halogenated alkanes such as dichloroethanes, dibromoethane, methylene chloride, and dibromomethane; bifunctional halogenated tin compounds such as dichlorotin, monomethyldichlorotin, dimethyldichlorotin, monoethyldichlorotin, diethyldichlorotin, monobutyldichlorotin, and dibutyldichlorotin; and the like.

The amount of the bifunctional coupling agent to be used may be determined according to the proportions of the hydrogenated block copolymer A and the hydrogenated block copolymer B constituting the hydrogenated block copolymer composition.

Thus, in the step (3a), as a result of addition of the bifunctional coupling agent to the solution containing a terminally active aromatic vinyl-conjugated diene block copolymer in an amount such that the total amount of the functional groups is less than 1 molar equivalent relative to the active terminal thereof, a portion of the terminally active aromatic vinyl-conjugated diene block copolymer is coupled to form a block copolymer B' before hydrogenation for forming the hydrogenated block copolymer B. The residual terminally active aromatic vinyl-conjugated diene block copolymer without reacting with the bifunctional coupling agent is left unreacted in the solution while it maintains the active terminals.

<Step (4a)>

Then, in the step (4a), a solution containing the block copolymer B' and a block copolymer A' is prepared by adding an aromatic vinyl monomer to the solution containing a block copolymer B' prepared in the step (3a), and polymerizing the aromatic vinyl monomer.

In the step (4a), as a result of addition of the aromatic vinyl monomer to the solution prepared in the step (3a), the aromatic vinyl monomer is polymerized to extend the aromatic vinyl polymer chain having the active terminal in the residual terminally active aromatic vinyl-conjugated diene block copolymer without reacting with the bifunctional coupling agent. Thereby, a block copolymer A' is prepared. The block copolymer A' will form a block copolymer before hydrogenation for forming the hydrogenated block copolymer A.

At this time, the aromatic vinyl polymer chain famed in the step (4a) will form the aromatic vinyl polymer block $Ar2^{\alpha}$ having a relatively large weight average molecular weight in the hydrogenated block copolymer A in the hydrogenated block copolymer composition. For this reason, the polymerization conditions in the step (4a) including the amount of the aromatic vinyl monomer may be determined according to the target weight average molecular weight of the aromatic vinyl polymer block $Ar2^{\alpha}$, or the like (for example, the polymerization conditions may be determined in the ranges described in the step (1)).

<Steps (5a) and (6a)>

Then, the hydrogenated block copolymer composition used in the present invention can be prepared through the operations in the steps (5a) and (6a) described above from the solution containing the block copolymer B' and the block copolymer A' prepared in the step (4a). The steps (5a) and (6a) described above are the same as the steps (6) and (7) described above, and the same conditions can be used.

The resin composition according to the present invention contains a polyolefin thermoplastic resin C, in addition to the hydrogenated block copolymer composition described above.

The polyolefin thermoplastic resin C used in the present invention is not particularly limited as long as it is a thermoplastic resin having an olefin as a main repeating unit, and may be any of a homopolymer of an α-olefin, a copolymer of two or more α-olefins, and a copolymer of an α-olefin and a monomer other than an α-olefin, or may otherwise be modified (co)polymers thereof. The polyolefin thermoplastic resin C preferably substantially free of an aromatic vinyl polymer unit. The polyolefin thermoplastic resin C preferably contains α-olefin units in an amount of 90% by weight or more, more preferably 95% by weight or more, and further preferably substantially 100% by weight.

Examples of the polyolefin thermoplastic resin C used in the present invention include homopolymers or copolymers of α-olefins such as ethylene and propylene, for example, homopolymers of α-olefins such as polyethylene (e.g., linear low density polyethylene (LLDPE), low density polyethylene (LDPE), middle density polyethylene (MDPE), high density polyethylene (HDPE), and metallocene polyethylene), polypropylene, metallocene polypropylene, polymethylpentene, and polybutene; copolymers of ethylene and another α-olefin, for example, an ethylene-propylene random copolymer, an ethylene-propylene block copolymer, an ethylene-butene-1 copolymer, an ethylene-propylene-butene-1 copolymer, and an ethylene-cyclic olefin copolymer; copolymers of an α-olefin and a carboxylic acid unsaturated alcohol mainly composed of the α-olefin and saponified products thereof, for example, an ethylene-vinyl acetate copolymer, and an ethylene-vinyl alcohol copolymer; copolymers of an α-olefin and an α,β-unsaturated carboxylic acid ester or an α,β-unsaturated carboxylic acid, and the like mainly composed of the α-olefin, for example, an ethylene-α,β-unsaturated carboxylic acid ester copolymer (an ethylene-ethyl acrylate copolymer, an ethylene-methyl methacrylate copolymer, or the like), an ethylene-α, β-unsaturated carboxylic acid copolymer (an ethylene-acrylic acid copolymer, and an ethylene-methacrylic acid copolymer, and the like); an acid-modified olefin resin obtained by modifying an α-olefin (co)polymer such as polyethylene or polypropylene with an unsaturated carboxylic acid such as acrylic acid, methacrylic acid, maleic acid, anhydrous maleic acid, fumaric acid, itaconic acid and/or an anhydride thereof; an ionomer resin obtained by causing Na ion or Zn ion or the like to act on a copolymer of ethylene and methacrylic acid or the like; and a mixture thereof. Among these, a polypropylene resin (i.e., a homopolymer of propylene or a copolymer of propylene as a main component and another α-olefin) is preferable, and a homopolymer of propylene or a copolymer of propylene as a main component and ethylene is more preferable. The polypropylene resin preferably contains propylene units in an amount of 50% by weight or more, more preferably 75% by weight or more. These resins used as the polyolefin thermoplastic resin C can be used alone or in combination.

Specific examples of the polyolefin thermoplastic resin C include "Vistamaxx6102" (trade name: available from Exxon Corporation, a propylene-ethylene copolymer containing propylene units as a main component, ethylene content: 16%, MFR 3 g/10 min (230° C., 2.16 kg, ASTMD1238), density: 0.862 g/cm³), "PT-100" (trade name: available from LCY CHEMICAL CORP., homopolypropylene, MFR 1.6 g/10 min (230° C., 21.6 N), melting point: 164° C., propylene content: 100 mol %), and the like.

Although not particularly limited, the weight average molecular weight of the polyolefin thermoplastic resin C is usually selected from the range of 10,000 to 5,000,000, and preferably selected from the range of 50,000 to 800,000.

The density of the polyolefin thermoplastic resin C is usually selected from the range of 0.80 to 0.95 g/cm³, preferably from the range of 0.85 to 0.94 g/cm³.

The melt index of the polyolefin thermoplastic resin C, as a value measured in accordance with ASTM D-1238 (Condition G, 200° C., 5 kg), is usually selected from the range of 1 to 1000 g/10 min, preferably from the range of 3 to 500 g/10 min.

In the resin composition according to the present invention, the weight ratio (C/A+B) of the content of the polyolefin thermoplastic resin C to the total content of the hydrogenated block copolymer A and the hydrogenated block copolymer B is preferably 10/90 to 90/10, more preferably 30/70 to 85/15, further preferably 50/50 to 80/20. With this range of content ratio, the tensile stress, the restoring force, and the impact resistance of the molded article to be obtained can be enhanced in a well-balanced manner.

The resin composition according to the present invention may further contain, as necessary, an antioxidant, a tackifier resin, a softening agent, an antimicrobial agent, a photostabilizer, an ultraviolet absorbing agent, a dye, a lubricant, and the like.

The resin composition according to the present invention may contain, as necessary, an antioxidant, in addition to the hydrogenated block copolymer composition and the polyolefin thermoplastic resin C. The type of the antioxidant is not particularly limited, and examples thereof include hindered phenol compounds such as pentaerythritol tetrakis[3-(3,5-di-t-butyl-4-hydroxyphenyl)propionate], 2,6-di-t-butyl-p-cresol, and di-t-butyl-4-methylphenol; thiodicarboxylate esters such as dilauryl thiopropionate; phosphites such as tris(nonylphenyl) phosphite; and the like. Although not particularly limited, the amount of the antioxidant to be used is usually 10 parts by weight or less, preferably 0.5 to 5 parts by weight relative to 100 parts by weight of the hydrogenated block copolymer composition. These antioxidants may be used alone or in combination. The timing at which the antioxidant is added to the resin composition is not particularly limited. For example, the antioxidant may be added in advance to the hydrogenated block copolymer composition used to prepare the resin composition, or may be added when the hydrogenated block copolymer composition and the polyolefin thermoplastic resin C are mixed.

The resin composition according to the present invention may contain a polymer component other than the hydrogenated block copolymer A, the hydrogenated block copolymer B, and the polyolefin thermoplastic resin C in the range not impairing the advantageous effects of the present invention.

Examples of the polymer component other than the hydrogenated block copolymer A, the hydrogenated block copolymer B, and the polyolefin thermoplastic resin C which can be contained in the resin composition according to the present invention include aromatic vinyl-conjugated diene-aromatic vinyl block copolymers other than the hydrogenated block copolymer A and the hydrogenated block copolymer B, aromatic vinyl-conjugated diene block copolymers, aromatic vinyl homopolymers, conjugated diene homopolymers, aromatic vinyl-conjugated diene random copolymers, and branched polymers thereof; thermoplastic elastomers such as polyurethane thermoplastic elastomers, polyamide thermoplastic elastomers, and polyester thermoplastic elastomers; thermoplastic resins such as polyvinyl chloride, acrylonitrile-styrene copolymers, acrylonitrile-butadiene-styrene copolymers, and polyphenylene ether; and the like.

In the resin composition according to the present invention, the content of the polymer component other than the hydrogenated block copolymer A, the hydrogenated block copolymer B, and the polyolefin thermoplastic resin C is preferably 20% by weight or less, more preferably 10% by weight or less, further preferably 5% by weight or less, particularly preferably 1% by weight or less, most preferably substantially 0% by weight relative to the total polymer components.

The resin composition according to the present invention may be produced, for example, by a method of mixing the block copolymer composition, the polyolefin thermoplastic resin C, and various additives that are used as necessary. The method for mixing these components is not particularly limited, and examples thereof include a method of subject-ing the components to melt mixing under heat using a kneading apparatus such as a Banbury mixer, a kneader, a Labo plastomill, a single screw extruder, a twin screw extruder, or the like; and a method of dissolving the components in a solvent and evenly mixing the components, and then removing the solvent by heating or the like. Among these methods, the method of performing melt mixing under heat is preferable from the viewpoint of more efficiently performing the mixing. Although not particularly limited, the temperature at the time of melt mixing under heat is usually in the range of 100 to 250° C.

The resin composition according to the present invention may also be used as a molded article. Since the molded article obtained by using the resin composition according to the present invention ensures both tensile stress and restoring force at high levels, as well as excellent impact resistance and excellent thermal stability, the molded article may be used for various applications requiring stretchability, impact resistance, and thermal stability.

The resin composition according to the present invention can be used for applications including packaging films and packaging containers used for packaging clothing, foods, daily necessities, industrial materials, and the like; molding materials used for gloves, elastic bands, condoms, OA apparatuses, a variety of rolls for office equipment or the like, antivibration sheets for electric and electronic devices, antivibration rubbers, impact absorption sheets, impact buffer films and sheets, vibration suppression sheets for housing, vibration suppression damper materials, and the like; elastic fibers used for clothing, sporting goods, and the like; various tube materials; and the like.

The molded article obtained by using the resin composition according to the present invention contains the hydrogenated block copolymer A, the hydrogenated block copolymer B, and the polyolefin thermoplastic resin C described above. The content ratios of these components in the molded article are the same as the content ratios of these components in the resin composition, and the preferred ranges thereof are also the same.

Although not particularly limited, the resin composition according to the present invention may be molded by an extrusion molding method, an injection molding method, a cast molding method, and the like.

By molding the resin composition according to the present invention by an extrusion molding method, molded articles having various shapes such as a film, a sheet, a tube, and the like can be obtained. The extrusion molding method is not particularly limited as long as it employs a molding method of heating the resin composition according to the present invention to melt the thermoplastic polymer components contained in the resin composition according to the present invention, and then extruding the resulting composition from an extruder. The extrusion molding method may be inflation molding in which air is blown into the extruded resin composition.

The molding temperature at the time of molding the resin composition by the extrusion molding method is preferably, as the temperature of the resin composition, 255° C. or less, more preferably 250° C. or less. The lower limit may be any temperature at which the thermoplastic polymer components contained in the resin composition melt, for example, 200° C. or more. With the molding temperature within this range, a homogeneous molded article which is also excellent in uniformity of shape can be obtained.

The extruder used in the extrusion molding method is not particularly limited, and a single screw extruder, a twin screw extruder, and the like may be used.

Further, by molding the resin composition according to the present invention by the injection molding method, a molded article having an arbitrarily shape such as a packaging container can be obtained. The injection molding temperature may be the same as the extrusion molding temperature. An injection molding device used in the injection molding method is not particularly limited, and any known injection molding devices can be used.

Further, by molding the resin composition according to the present invention by the cast molding method, a molded article such as a film can be obtained. In the cast molding method, by casting a solution or dispersion obtained by dissolving or dispersing the resin composition according to the present invention in a solvent and then removing the solvent, a molded article such as a film can be obtained.

The stretchable film according to the present invention can be obtained by molding the resin composition according to the present invention by the extrusion molding method, cast molding method, and the like, described above. As the method for forming the stretchable film according to the present invention, the extrusion molding method is preferable, in particular, an extrusion molding method using a T-die is more preferable from the viewpoint of producing a smooth stretchable film with particularly high productivity. Specific examples of extrusion molding methods using a T-die include a method of extruding the resin composition heat-melted at the molding temperature described above from a T-die attached to a screw extruder such as a single screw extruder or a twin screw extruder, and winding the extruded product with a winding roll under cooling. The stretchable film may be stretched when cooled with the winding roll. The stretchable film to be wound may be famed by applying a melted product of the resin composition onto a base made of polyethylene terephthalate, polyethylene, polypropylene, a non-woven fabric, or a releasing paper, or may be famed by sandwiching a melted product of the resin composition with such bases. The stretchable film thus obtained may be used in a combined form with the base(s), or may be used after peeled from the base(s).

The thickness of the stretchable film is not particularly limited, and is usually 0.01 to 5 mm, preferably 0.03 to 0.5 mm.

The stretchable film according to the present invention may be used as a single layer, or may be laminated with another member to be used as a multilayer product, depending on the application. Specific examples of the cases where the stretchable film is used as a single layer include stretchable films (elastic films) used for hygiene products such as disposable diapers and sanitary goods, protective films for protecting an optical film and the like, heat-shrinkable films used for shrink packaging of containers or those used as a heat-shrinkable label. Specific examples of the cases where the stretchable film is used as a multilayer product include a case of slitting a film, applying a hot-melt adhesive or the like to the film to form a tape, adhering the tape in a shrunk state to a non-woven fabric, a woven fabric, a plastic film, or a laminate thereof, and relaxing the shrinkage of the tape, thereby forming a stretchable gather member. Furthermore, in other applications, the stretchable film may be appropriately processed according to a known method and used, for example, as a stretchable member such as a base material for a stretchable compress, gloves, surgical gloves, finger sack, hemostatic bands, contraceptive tools, headbands, goggle bands, rubber bands, and the like.

The sheet according to the present invention can be obtained by molding the resin composition according to the present invention by the extrusion molding method or the like described above. The thickness of the sheet according to the present invention is not particularly limited, and is usually 0.5 to 30 mm, preferably 1 to 10 mm. The sheet according to the present invention can be used for, for example, applications including materials for packaging containers for packaging clothing, foods, daily necessities, industrial materials, and the like, and molding materials for antivibration sheets for electric and electronic devices, impact absorption sheets, impact buffer sheets, vibration suppression sheets for housing, vibration suppression damper materials, and the like.

The tube according to the present invention can be obtained by molding the resin composition according to the present invention by the extrusion molding method or the like described above. The tube according to the present invention can be used, for example, as tubes for various industrial machines and industrial vehicles such as automobile tubes including vacuum-control tubes, emission-control tubes, fuel-line tubes, and air-brake tubes, tubes for hydraulic equipment, tubes for pneumatic equipment, tubes for centralized lubrication equipment, tubes for coating equipment, tubes for chemical plants, tubes for transferring solvents and chemicals, tubes for transferring various liquefied gases, tubes for food-related equipment, tubes for physical and chemical equipment, tubes for metering pumps, tubes for spinning machines, tubes for packing machines, tubes for printing machines, tubes for transmission machines, tubes for water treatment apparatuses, tubes for fluid devices, tubes for industrial robots, tubes for industrial vehicles, tubes for agricultural machines, tubes for construction machines, tubes for machining tools, tubes for injection-molding machines, tubes for power-saving machines, tubes for air tools such as air drivers and air hammers, tubes for operating parts, tubes for pneumatic/electric signals, tubes for pneumatic pressure/signals, tubes for equipment requiring heat resistance, high insulation, and high-frequency properties, tubes for spot welding equipment; tubes for medical equipment; and the like.

EXAMPLES

Hereinafter, the present invention will be more specifically described by way of Examples and Comparative Examples, but the present invention will not be limited only to these Examples. To be noted, "parts" and "%" are weight-based unless otherwise specified. The following test methods were performed in Examples and Comparative Examples.

[Weight Average Molecular Weight, Molecular Weight Distribution]

A chart based on the molecular weight against polystyrene standards was obtained by high performance liquid chromatography where tetrahydrofuran at a flow rate of 0.35 ml/min was used as a carrier, and the weight average molecular weight and the molecular weight distribution were determined based on the obtained chart. The measurement was performed using an apparatus HLC8320 available from Tosoh Corporation, three columns (Shodex (registered trademark) KF-404HQ available from Showa Denko K.K.) connected in series (column temperature: 40° C.), and a differential refractometer and an ultraviolet detector as detectors. The molecular weight was calibrated against 12 points of polystyrene standards (500 to 3,000,000) available from Polymer Laboratories Ltd.

[Weight Ratio of Block Copolymers in (Hydrogenated) Block Copolymer Composition]

The weight ratio of the block copolymers was determined from the ratio of the areas of the peaks corresponding to the block copolymers in a chart obtained by high performance liquid chromatography.

[Weight Average Molecular Weights of Styrene Polymer Blocks in (Hydrogenated) Block Copolymer]

According to the method described in Rubber Chem. Technol., 45, 1295 (1972), the isoprene polymer block of each of the (hydrogenated) block copolymers was decomposed by reacting the (hydrogenated) block copolymers with ozone, followed by reduction with lithium aluminum hydride.

Specifically, the following procedure was performed. Namely, 300 mg of a sample was dissolved in a reaction vessel containing 100 ml of dichloromethane treated with a molecular sieve. This reaction vessel was placed into a cooling tank, and was cooled to −25° C. Thereafter, while oxygen was flowing into the reaction vessel at a flow rate of 170 ml/min, ozone generated by an ozone generator was introduced. After 30 minutes had passed from the start of the reaction, it was confirmed that the reaction had completed by introducing the gas flowing out of the reaction vessel into a potassium iodide aqueous solution. In the next step, 50 ml of diethyl ether and 470 mg of lithium aluminum hydride were placed into another reaction vessel purged with nitrogen. While the reaction vessel was being cooled with iced water, the solution reacted with ozone was slowly added dropwise to the reaction vessel. Thereafter, the reaction vessel was placed into a water bath, and was gradually heated, and the solution was refluxed at 40° C. for 30 minutes. Subsequently, while the solution was being stirred, diluted hydrochloric acid was added dropwise to the reaction vessel in small portions. The addition was continued until generation of hydrogen was hardly observed. After this reaction, a solid product famed in the solution was separated through filtration. The solid product was extracted with 100 ml of diethyl ether for 10 minutes. The extract and the filtrate obtained from the filtration were combined, and the solvent was distilled off to yield a solid sample. The resulting sample as above was measured for the weight average molecular weights according to the above-described weight average molecular weight measuring method, and the values were defined as the weight average molecular weights of the styrene polymer blocks.

[Weight Average Molecular Weight of (Hydrogenated) Isoprene Polymer Block in (Hydrogenated) Block Copolymer]

For each of the (hydrogenated) block copolymers, the weight average molecular weight of the styrene polymer block was subtracted from the weight average molecular weight of the corresponding block copolymer determined as described above, and the weight average molecular weight of the (hydrogenated) isoprene polymer block was determined based on the calculated value.

[Content of Styrene Units in (Hydrogenated) Block Copolymer]

The content of styrene units was determined based on the ratio of intensities detected by the differential refractometer and the ultraviolet detector in the measurement by high performance liquid chromatography. To be noted, copolymers having different contents of styrene units were preliminarily prepared, and were used to create a calibration curve.

[Content of Styrene Units in Entire (Hydrogenated) Block Copolymer Composition]

The content of styrene units in an entire (hydrogenated) block copolymer composition was determined based on $^1$H-NMR measurement using deuterochloroform as a solvent.

[Vinyl Bond Content in (Hydrogenated) Isoprene Polymer Block]

The vinyl bond content in a (hydrogenated) isoprene polymer block was determined based on $^1$H NMR measurement using deuterochloroform as a solvent.

[Hydrogenation Ratio (Mol %) of Olefins in (Hydrogenated) Block Copolymer Composition]

For each of the block copolymer compositions before hydrogenation and the hydrogenated block copolymer compositions after hydrogenation, the olefin content was determined by $^1$H-NMR spectrum measurement using deuterochloroform as a solvent. Based on the difference between the olefin contents before and after hydrogenation, the hydrogenation ratio (mol %) of olefins was calculated.

In the $^1$H-NMR spectrum measurement, deuterochloroform was used as a solvent, and an NMR analyzer JMN-AL series AL400 (available from JEOL, Ltd.) was used.

In Examples and Comparative Examples, the block copolymer compositions before hydrogenation and the hydrogenated block copolymer composition after hydrogenation both contained only isoprene units as olefin-derived monomer units. Thus, the hydrogenation ratio of isoprene was determined in the measurement, and this ratio was defined as the hydrogenation ratio of olefins.

[Iodine Value of (Hydrogenated) Block Copolymer Composition]

The iodine value of each of the (hydrogenated) block copolymer compositions was measured according to JIS K0070.

[Melt Index of (Hydrogenated) Block Copolymer Composition]

The melt index of the (hydrogenated) block copolymer composition was measured according to ASTM D-1238 (Condition G, 200° C., 5 kg).

[Modulus at 200%]

Each of the films obtained in Examples and Comparative Examples was cut into a sample having a width of 25 mm, and one of them was measured along a direction orthogonal to the melt flow during film formation. The measurement was performed in the following manner. The sample was fixed to a Tensilon universal tester "RTC-1210" (available from ORIENTEC, Co., Ltd.) under no tension with a distance between chucks of 40 mm. The sample was stretched to 200% at a rate of 300 mm/min, and then was returned to the initial distance between chucks at a rate of 300 mm/min. Furthermore, the sample was again stretched to 200% at the same rate, and was again returned to the initial distance between chucks at the same rate. The tensile stress at 200% elongation for the second time was determined as modulus at 200%. A higher modulus at 200% is determined as higher tensile stress.

[Permanent Elongation]

Each of the films obtained in Examples and Comparative Examples was measured using the Tensilon universal tester described above according to ASTM 412 along the direction orthogonal to the melt flow during film formation. Specifically, the shape of the sample used was that of Die A, and the stretchable film was stretched at an elongation percentage of 200% where the gauge length before the stretch was 40 mm. Thereafter, the sample was kept as it was for 10 minutes, was rapidly shrunk without rebounding, and was left to stand for 10 minutes. The gauge length was then measured, and the permanent elongation was determined based on the following expression:

permanent elongation (%)=(L1–L0)/L0×100

L0: gauge length (mm) before elongation

L1: gauge length (mm) after the sample was shrunk and left to stand for 10 minutes A smaller permanent elongation is determined as higher restoring force.

[Bag-Breaking Toughness]

Each of the films obtained in Examples and Comparative Examples was cut to prepare two film strips of 15 cm×9 cm. These film strips were superimposed on each other, and three of the four sides were heat-sealed at 140° C. and 0.4 MPa for a heating time of 1 second, thereby preparing a bag. The resulting bag was filled with water of 100 cc from one side which was not heat-sealed, and then the side was heat-sealed under the same conditions as described above, thereby preparing a 100-cc liquid packaging container. The obtained liquid packaging container was allowed to stand on an iron plate in an environment of 23° C., and then a drop test was performed in which an iron plate of 1 kg (9.8 N) was dropped three times from above the liquid packaging container. In the drop test, first, the vertical distance from the liquid packaging container to the iron plate was set to 10 cm. If the liquid packaging container did not break under the conditions described above, next, the vertical distance from the liquid packaging container to the iron plate was set to 20 cm, and the drop test was performed again. In this manner, the vertical distance from the liquid packaging container to the iron plate was increased by 10 cm at a time until the liquid packaging container broke, and the highest height (cm) at which the bag did not break was used as an index of bag-breaking toughness. The impact resistance tends to improve as the index of bag-breaking toughness increases. An index of bag-breaking toughness of 40 cm or more can be determined as excellent impact resistance.

[Viscosity Retention]

Each of the films obtained in Examples and Comparative Examples was subjected to a thermal degradation test (180° C. x 5 hours; in the presence of air) to measure the melt viscosity before thermal degradation test and that after thermal degradation test, and the viscosity retention was determined from the following expression. A higher viscosity retention is determined as higher thermal stability of resin composition.

Viscosity retention (%)=(melt viscosity after thermal degradation test/melt viscosity before thermal degradation test)×100

The melt viscosity was measured using a Flowtester CFT-500C (available from SHIMADZU Corporation) at a temperature of 180° C. under a load of 100 kgf/cm² with a die having a shape of 1 mmφ×10 mm.

Production Example 1

(1) Preparation of Block Copolymer Composition Before Hydrogenation 56.6 kg of cyclohexane, 270.6 mmol of ethylene glycol dibutyl ether, and 1.22 kg of styrene were added to a pressure-resistant reactor. While the system was being stirred at 40° C., 270.6 mmol of n-butyllithium (1.6M solution) was added. After the addition was completed, the system was heated to 50° C. and polymerized for 1 hour (first stage of polymerization). The polymerization conversion ratio of styrene at this time was 100%.

Subsequently, while the temperature was being controlled to keep 50 to 60° C., 6.49 kg of isoprene was continuously added to the reactor over 1 hour. The addition of isoprene was completed, followed by polymerization for another one hour (second stage of polymerization). The polymerization conversion ratio of isoprene at this time was 100%.

In the next step, while the temperature was being controlled to keep 50 to 60° C., 1.22 kg of styrene was continuously added over 1 hour. The addition of styrene was completed, followed by polymerization for another one hour to prepare a solution containing a terminally active styrene-isoprene-styrene triblock copolymer (third stage of polymerization). The polymerization conversion ratio of styrene at this time was 100%.

In the next step, 195 mmol of methanol as a polymerization terminator was added and mixed to deactivate a portion of the active terminal of the terminally active styrene-isoprene-styrene triblock copolymer, thereby preparing a solution containing a styrene-isoprene-styrene triblock copolymer which corresponds to a block copolymer B' for preparing a hydrogenated block copolymer B.

Thereafter, while the temperature was further successively being controlled to keep 50 to 60° C., 1.06 kg of styrene was continuously added over 1 hour. The addition of styrene was completed, followed by polymerization for another one hour to prepare a solution containing a terminally active styrene-isoprene-styrene triblock copolymer which corresponds to a block copolymer A' for preparing a hydrogenated block copolymer A (fourth stage of polymerization). The polymerization conversion ratio of styrene at this time was 100%.

Finally, the active terminal of the terminally active styrene-isoprene-styrene triblock copolymer was completely deactivated by adding and mixing 345 mmol of methanol as a polymerization terminator, to complete the polymerization reaction. Thereby, a solution containing a block copolymer composition before hydrogenation was prepared.

The amounts of the reagents used in the reactions are summarized in Table 1.

(2) Hydrogenation of Block Copolymer Composition Before Hydrogenation

The resulting solution containing a block copolymer composition before hydrogenation was hydrogenated to prepare a solution containing a hydrogenated block copolymer composition. The hydrogenation reaction was performed at a hydrogen pressure of 3 MPa and a reaction temperature of 80° C. for a reaction time of 3 hours after a Ni(AcAc)₂-TIBAL catalyst as a hydrogenating catalyst was added to the solution containing a block copolymer composition before hydrogenation obtained above in a proportion of 0.5% relative to the block copolymer composition before hydrogenation.

A portion of the solution containing a hydrogenated block copolymer composition obtained as described above was extracted, and the weight average molecular weight and the molecular weight distribution of the hydrogenated block copolymer composition (entire), the weight ratio of each hydrogenated block copolymer in the composition, the weight average molecular weight of the styrene polymer block in each hydrogenated block copolymer, the weight average molecular weight of the hydrogenated isoprene polymer block in each hydrogenated block copolymer, the styrene unit content in each hydrogenated block copolymer, the styrene unit content in the hydrogenated block copolymer composition (entire), the vinyl bond content of the hydrogenated isoprene polymer block in each hydrogenated block copolymer, and the hydrogenation ratio of olefins of the hydrogenated block copolymer composition (entire) were determined. These values are summarized in Table 2.

(3) Recovery of Hydrogenated Block Copolymer Composition 0.3 Parts of 2,6-di-t-butyl-p-cresol as an antioxidant was added to and mixed with 100 parts of the solution of a hydrogenated block copolymer composition obtained as described above. The mixed solution was added dropwise in small portions to hot water heated to 85 to 95° C., and the solvent was volatilized to yield a precipitate. The resulting precipitate was crushed, and was dried with hot air at 85° C. to recover a hydrogenated block copolymer composition in the form of crumbs. The hydrogenated block copolymer composition in the form of crumbs was fed to a single screw extruder including an underwater hot cutter at the leading end of the extruder, and was famed into cylindrical pellets having an average diameter of about 5 mm and an average length of about 5 mm. The pellets were placed into a hopper dryer heated to 60° C., and was dried for 10 hours while dry air at 60° C. was flowing, thereby obtaining a hydrogenated block copolymer composition. The iodine value and melt index of the resulting hydrogenated block copolymer composition were measured. These results are summarized in Table 2.

Production Example 2

A hydrogenated block copolymer composition was prepared in the same manner as in Production Example 1 except that the reaction time of the hydrogenation was changed from 3 hours to 1 hour, and the measurements were performed in the same manner as in Production Example 1. The results are summarized in Table 2.

Production Example 3

A hydrogenated block copolymer composition was prepared in the same manner as in Production Example 1 except that the amounts of styrene, ethylene glycol dibutyl ether, n-butyllithium, isoprene, and methanol were respectively changed as shown in Table 1 and the reaction time of the hydrogenation was changed from 3 hours to 15 minutes, and the measurements were performed in the same manner as in Production Example 1. The results are summarized in Table 2.

Production Example 4

A hydrogenated block copolymer composition was prepared in the same manner as in Production Example 1 except that the amounts of styrene, ethylene glycol dibutyl ether, n-butyllithium, isoprene, and methanol were respectively changed as shown in Table 1 and the reaction time of the hydrogenation was changed from 3 hours to 2 hours, and the measurements were performed in the same manner as in Production Example 1. The results are summarized in Table 2.

Production Example 5

(1) Preparation of Block Copolymer Composition Before Hydrogenation 56.6 kg of cyclohexane, 451.5 mmol of ethylene glycol dibutyl ether, and 1.04 kg of styrene were added to a pressure-resistant reactor. While the system was being stirred at 40° C., 451.5 mmol of n-butyllithium (1.6M solution) was added. After the addition was completed, the system was heated to 50° C. and polymerized for 1 hour (first stage of polymerization). The polymerization conversion ratio of styrene at this time was 100%.

Subsequently, while the temperature was being controlled to keep 50 to 60° C., 7.99 kg of isoprene was continuously added to the reactor over 1 hour. The addition of isoprene was completed, followed by polymerization for another one hour to prepare a solution containing a terminally active styrene-isoprene diblock copolymer (second stage of polymerization). The polymerization conversion ratio of isoprene at this time was 100%.

In the next step, 154 mmol of dimethyldichlorosilane as a bifunctional coupling agent was added and mixed to couple a portion of the terminally active styrene-isoprene diblock copolymer, thereby preparing a solution containing a styrene-isoprene-styrene triblock copolymer which corresponds to a block copolymer B' for preparing a hydrogenated block copolymer B.

Thereafter, while the temperature was further successively being controlled to keep 50 to 60° C., 0.96 kg of styrene was continuously added over 1 hour. The addition of styrene was completed, followed by polymerization for another one hour to prepare a solution containing a terminally active styrene-isoprene-styrene triblock copolymer which corresponds to a block copolymer A' for preparing a hydrogenated block copolymer A (third stage of polymerization). The polymerization conversion ratio of styrene at this time was 100%.

Finally, the active terminal of the terminally active styrene-isoprene-styrene triblock copolymers was completely deactivated by adding and mixing 595 mmol of methanol as a polymerization terminator, to complete the polymerization reaction. Thereby, a solution containing a block copolymer composition before hydrogenation was prepared.

The amounts of the reagents used in the reactions are summarized in Table 1.

(2) Hydrogenation of Block Copolymer Composition Before Hydrogenation

The resulting solution containing a block copolymer composition before hydrogenation was hydrogenated to prepare a solution containing a hydrogenated block copolymer composition. The hydrogenation was performed under the same conditions as those in Production Example 1. A portion of the resulting solution containing a hydrogenated block copolymer composition was extracted, and the measurements were performed in the same manner as in Production Example 1. The results are summarized in Table 2.

(3) Recovery of Hydrogenated Block Copolymer Composition

A hydrogenated block copolymer composition was obtained using the resulting solution containing a hydrogenated block copolymer composition in the same manner as in Production Example 1. Thereafter, the measurements were performed in the same manner as in Production Example 1. The results are summarized in Table 2.

Production Example 6

(1) Preparation of Block Copolymer Composition Before Hydrogenation 56.6 kg of cyclohexane, 284.2 mmol of ethylene glycol dibutyl ether, and 1.75 kg of styrene were added to a pressure-resistant reactor. While the system was being stirred at 40° C., 284.2 mmol of n-butyllithium (1.6M solution) was added. After the addition was completed, the system was heated to 50° C. and polymerized for 1 hour (first stage of polymerization). The polymerization conversion ratio of styrene at this time was 100% by weight.

Subsequently, while the temperature was being controlled to keep 50 to 60° C., 6.49 kg of isoprene was continuously added to the reactor over 1 hour. The addition of isoprene was completed, followed by polymerization for another one hour (second stage of polymerization). The polymerization conversion ratio of isoprene at this time was 100%.

In the next step, while the temperature was being controlled to keep 50 to 60° C., 1.75 kg of styrene was continuously added over 1 hour. The addition of styrene was completed, followed by polymerization for another one hour to prepare a solution containing a terminally active styrene-isoprene-styrene triblock copolymer (third stage of polymerization). The polymerization conversion ratio of styrene at this time was 100%.

Finally, the active terminal of the terminally active styrene-isoprene-styrene triblock copolymers was completely deactivated by adding and mixing 568.4 mmol of methanol as a polymerization terminator, to complete the polymerization reaction. Thereby, a solution containing a block copolymer composition before hydrogenation was prepared.

The amounts of the reagents used in the reactions are summarized in Table 1.

(2) Hydrogenation of Block Copolymer Composition Before Hydrogenation

The resulting solution containing a block copolymer composition before hydrogenation was hydrogenated to prepare a solution containing a hydrogenated block copolymer composition. The hydrogenation was performed under the same conditions as those in Production Example 1. A portion of the resulting solution containing a hydrogenated block copolymer composition was extracted, and the measurements were performed in the same manner as in Production Example 1. The results are summarized in Table 2.

(3) Recovery of Hydrogenated Block Copolymer Composition

A hydrogenated block copolymer composition was obtained using the resulting solution containing a hydrogenated block copolymer composition in the same manner as in Production Example 1. Thereafter, the measurements were performed in the same manner as in Production Example 1. The results are summarized in Table 2.

Production Example 7

An unhydrogenated block copolymer composition was prepared in the same manner as in Production Example 1 except that the amounts of styrene, ethylene glycol dibutyl ether, n-butyllithium, isoprene, and methanol were changed as shown in Table 1 and the hydrogenation was not performed. The measurements were performed using the resulting unhydrogenated block copolymer composition in the same manner as in Production Example 1. The results are summarized in Table 2.

Production Example 8

An unhydrogenated block copolymer composition was prepared in the same manner as in Production Example 6 except that the amounts of styrene, ethylene glycol dibutyl ether, n-butyllithium, isoprene, and methanol were changed as shown in Table 1 and the hydrogenation was not performed. The measurements were performed using the resulting unhydrogenated block copolymer composition in the same manner. The results are summarized in Table 2.

TABLE 1

| | | Production Example | | | | | | | |
|---|---|---|---|---|---|---|---|---|---|
| | | 1 | 2 | 3 | 4 | 5 | 6 | 7 | 8 |
| Cyclohexane (kg) | | 56.6 | 56.6 | 56.6 | 56.6 | 56.6 | 56.6 | 56.6 | 56.6 |
| Ethylene glycol dibutyl ether (mmol) | | 270.6 | 270.6 | 273.4 | 275.4 | 451.5 | 284.2 | 161.6 | 175.3 |
| n-Butyllithium (mmol) | | 270.6 | 270.6 | 273.4 | 275.4 | 451.5 | 284.2 | 161.6 | 175.3 |
| Styrene (kg) | [First stage of polymerization] | 1.22 | 1.22 | 1.02 | 0.97 | 1.04 | 1.75 | 1.26 | 1.75 |
| Isoprene (kg) | [Second stage of polymerization] | 6.49 | 6.49 | 5.00 | 7.30 | 7.99 | 6.49 | 6.49 | 6.49 |
| Styrene (kg) | [Third stage of polymerization] | 1.22 | 1.22 | 1.02 | 0.97 | — | 1.75 | 1.26 | 1.75 |
| Methanol (mmol) | [Added after third stage of polymerization] | 195 | 195 | 197 | 198 | — | — | 113 | — |
| Dimethyl dichlorosilane (mmol) | [Added after third stage of polymerization] | — | — | — | — | 154 | — | — | — |
| Styrene (kg) | [Fourth stage of polymerization] | 1.06 | 1.06 | 2.95 | 0.76 | 0.96 | — | 0.97 | — |
| Methanol (mmol) | [Added after fourth stage of polymerization] | 345 | 345 | 350 | 353 | 595 | 568.4 | 210 | 351 |

TABLE 2

| | Production Example | | | | | | | |
|---|---|---|---|---|---|---|---|---|
| | 1 | 2 | 3 | 4 | 5 | 6 | 7 | 8 |
| (Hydrogenated) block copolymer A | | | | | | | | |
| Weight average molecular weight [Mw(Ar1$^a$)] of relatively small styrene block (Ar1$^a$) | 5000 | 5000 | 4000 | 3700 | 2500 | — | 8000 | — |
| Weight average molecular weight [Mw(Ar2$^a$)] of relatively large styrene block (Ar2$^a$) | 25000 | 25000 | 57000 | 18000 | 12500 | — | 40000 | — |
| Mw(Ar2$^a$/Mw(Ar1$^a$) | 5.0 | 5.0 | 14.3 | 4.9 | 5.0 | — | 5.0 | — |
| Weight average molecular weight [Mw(HD$^a$)] of (hydrogenated) isoprene block | 38000 | 38000 | 30000 | 41000 | 21250 | — | 64000 | — |
| Vinyl bond content (%) in (hydrogenated) isoprene block | 30 | 29 | 29 | 32 | 31 | — | 31 | — |

TABLE 2-continued

| | Production Example | | | | | | | |
|---|---|---|---|---|---|---|---|---|
| | 1 | 2 | 3 | 4 | 5 | 6 | 7 | 8 |
| Styrene unit content (%) in (hydrogenated) block polymer A | 53 | 53 | 75.6 | 42.5 | 34.2 | — | 52 | — |
| (Hydrogenated) block copolymer B | | | | | | | | |
| Weight average molecular weight [Mw(Ar1$^b$) = Mw(Ar2$^b$)] of (hydrogenated) styrene block | 5000 | 5000 | 4000 | 3700 | 2500 | 6000 | 8000 | 12000 |
| Weight average molecular weight [Mw(HD$^b$)] of (hydrogenated) isoprene block | 38000 | 38000 | 30000 | 41000 | 42500 | 38000 | 64000 | 64000 |
| Vinyl bond content (%) in (hydrogenated) isoprene block | 30 | 29 | 29 | 32 | 31 | 32 | 31 | 28 |
| Styrene unit content (%) in (hydrogenated) block polymer B | 27 | 27 | 29 | 21 | 14.8 | 35 | 28 | 35 |
| Block copolymer composition (entire) | | | | | | | | |
| Weight average molecular weight | 52000 | 52000 | 58000 | 50000 | 49000 | 50000 | 88000 | 88000 |
| Molecular weight distribution | 1.031 | 1.030 | 1.033 | 1.032 | 1.032 | 1.014 | 1.032 | 1.012 |
| Styrene unit content (%) | 35 | 35 | 50 | 27 | 20 | 35 | 35 | 35 |
| (Hydrogenated) block copolymer A/(hydrogenated) block copolymer B (weight ratio) | 30/70 | 30/70 | 45/55 | 27/73 | 15/85 | — | 30/70 | — |
| Hydrogenation ratio of olefins (mol %) | 100 | 50 | 20 | 80 | 100 | 100 | 0 | 0 |
| Iodine value (gI$_2$/100 g) | 0 | 121.0 | 148.8 | 54.3 | 0 | 0 | 241.9 | 241.9 |
| Melt index (g/10 min) | 14 | 22 | 41 | 31 | 28 | 33 | 82 | 62 |

30 Parts of the hydrogenated block copolymer composition obtained in Production Example 1 and 70 parts of a polypropylene resin (trade name: "Vistamaxx 6102", available from Exxon Corporation, a propylene-ethylene copolymer containing propylene units as a main component, ethylene content: 16%, MFR: 3 g/10 min (230° C., 2.16 kg, ASTMD1238), density: 0.862 g/cm$^3$) were placed into a twin screw extruder provided with a T-die. Then, the hydrogenated block copolymer composition and the polypropylene resin were heat-melted and kneaded at 200° C. in this twin screw extruder to form a resin composition, which was then continuously extruded for 20 minutes by being sandwiched between PET release films to form a film having an average thickness of 0.05 mm. Thereafter, the PET release films were removed to obtain a film. The film was famed under the following specific conditions:

(Conditions of Film Formation)
Composition process speed: 5 kg/hr
Film take-up rate: 4 m/min
Extruder temperature: inlet: 100° C., T-die: 200° C.
Screw: full flight
Extruder L/D: 30
T-die: width: 200 mm, lip: 0.5 mm
Using the resulting film, modulus at 200%, permanent elongation, bag-breaking toughness, and viscosity retention were measured. The results are summarized in Table 3.

Examples 2 to 5, Comparative Examples 1 to 3

A resin composition was prepared in the same manner as in Example 1 except that the hydrogenated block copolymer composition used was changed as shown in Table 3, thereby obtaining a film. The obtained film was evaluated in the same manner as in Example 1. The results are summarized in Table 3.

TABLE 3

| | | Example | | | | | Comparative Example | | |
|---|---|---|---|---|---|---|---|---|---|
| | | 1 | 2 | 3 | 4 | 5 | 1 | 2 | 3 |
| Proportion (parts) of resin composition | | | | | | | | | |
| Block copolymer Composition | Production Example 1 | 30 | | | | | | | |
| | Production Example 2 | | 30 | | | | | | |
| | Production Example 3 | | | 30 | | | | | |
| | Production Example 4 | | | | 30 | | | | |
| | Production Example 5 | | | | | 30 | | | |
| | Production Example 6 | | | | | | 30 | | |
| | Production Example 7 | | | | | | | 30 | |
| | Production Example 8 | | | | | | | | 30 |
| Polypropylene resin | | 70 | 70 | 70 | 70 | 70 | 70 | 70 | 70 |
| Evaluations of tensile stress and restoring force | | | | | | | | | |
| Modulus at 200% (MPa) | | 2.1 | 1.3 | 3.2 | 1.8 | 3.4 | 3.1 | 1.1 | 1.4 |
| Permanent elongation | | 30 | 23 | 25 | 21 | 22 | 56 | 21 | 71 |
| Evaluation of impact resistance | | | | | | | | | |
| Bag-breaking toughness (cm) | | 70 | 80 | 50 | 70 | 90 | 30 | 80 | 40 |
| Evaluation of thermal stability | | | | | | | | | |
| Viscosity retention (%) | | 100 | 92 | 88 | 95 | 100 | 100 | 75 | 72 |

As shown in Table 3, by using the resin compositions comprising a hydrogenated block copolymer composition comprising a hydrogenated block copolymer A represented by General Formula (A) and a hydrogenated block copolymer B represented by General Formula (B) in a proportion of A/B (weight ratio)=10/90 to 80/20 and having a hydrogenation ratio of olefins of 10 to 100% in the polymer components constituting the hydrogenated block copolymer composition; and a polyolefin thermoplastic resin C, the resulting films (molded articles) achieved both tensile stress and restoring force at high levels, and also achieved excellent impact resistance and excellent thermal stability (Examples 1 to 5).

On the other hand, when the hydrogenated block copolymer A represented by General Formula (A) was not used, the resulting film (molded article) was inferior in restoring force, did not ensure both tensile stress and restoring force, and was also inferior in impact resistance (Comparative Example 1).

In addition, when a block copolymer composition having a hydrogenation ratio of olefins of less than 10% was used, the resulting film (molded article) was inferior in thermal stability (Comparative Example 2).

Furthermore, when a block copolymer composition not containing the hydrogenated block copolymer A represented by General Formula (A) and having a hydrogenation ratio of olefins of less than 10% was used, the resulting film (molded article) was inferior in restoring force, did not ensure both tensile stress and restoring force, and was also inferior in thermal stability (Comparative Example 3).

The invention claimed is:

1. A resin composition comprising a hydrogenated block copolymer composition comprising a hydrogenated block copolymer A represented by General Formula (A) and a hydrogenated block copolymer B represented by General Formula (B); and a polyolefin thermoplastic resin C, wherein the weight ratio (A/B) of the hydrogenated block copolymer A to the hydrogenated block copolymer B in the hydrogenated block copolymer composition is 10/90 to 80/20, and the hydrogenation ratio of olefins in polymer components constituting the hydrogenated block copolymer composition is 10 to 100% the hydrogenation ratio being the proportion (mol %) of hydrogenated bonds of the total non-aromatic carbon-carbon double bonds contained in the polymer components before hydrogenation:

$$Ar1^a\text{-}HD^a\text{-}Ar2^a \qquad (A)$$

$$Ar1^b\text{-}HD^b\text{-}Ar2^b \qquad (B)$$

wherein in General Formulae (A) and (B) above, $Ar1^a$, $Ar2^a$, $Ar1^b$, and $Ar2^b$ are each an aromatic vinyl polymer block, $HD^a$ and $HD^b$ are each a hydrogenated polymer block of a conjugated diene polymer, the ratio $(Mw(Ar2^a)/Mw(Ar1^a))$ of the weight average molecular weight of $Ar2^a$ $(Mw(Ar2^a))$ to the weight average molecular weight of $Ar1^a$ $(Mw(Ar1^a))$ is 2.6 to 66, and the ratio $(Mw(Ar2^b)/Mw(Ar1^b))$ of the weight average molecular weight of $Ar2^b$ $(Mw(Ar2^b))$ to the weight average molecular weight of $Ar1^b$ $(Mw(Ar1^b))$ is 0.95 to 1.05, and the ratio of the vinyl bond content of the hydrogenated polymer block $HD^b$ of the conjugated diene polymer constituting the hydrogenated block copolymer B to the vinyl bond content of the hydrogenated polymer block $HD^a$ of the conjugated diene polymer constituting the hydrogenated block copolymer A is in the range of 0.95 to 1.05.

2. The resin composition according to claim 1, wherein the proportion of aromatic vinyl monomer units is 20 to 70% by weight in the total repeating units of the polymer components in the hydrogenated block copolymer composition.

3. The resin composition according to claim 1, wherein $HD^a$ and $HD^b$ in General Formulae (A) and (B) of the hydrogenated block copolymer composition each have a vinyl bond content of 1 to 80 mol %.

4. The resin composition according to claim 1, wherein in General Formulae (A) and (B) of the hydrogenated block copolymer composition, $Ar1^a$, $Ar1^b$, and $Ar2^b$ each have a weight average molecular weight in the range of 2,000 to 40,000, and $HD^a$ and $HD^b$ each have a weight average molecular weight in the range of 10,000 to 300,000.

5. The resin composition according to claim 1, wherein the weight ratio (C/A+B) of the content of the polyolefin thermoplastic resin C to the total content of the hydrogenated block copolymer A and the hydrogenated block copolymer B is 10/90 to 90/10.

6. The resin composition according to claim 1, wherein the weight average molecular weight of the total polymer components constituting the hydrogenated block copolymer composition is 30,000 to 400,000.

7. The resin composition according to claim 1, wherein the polyolefin thermoplastic resin C is a polypropylene resin.

8. A stretchable film formed from the resin composition according to claim 1.

9. A sheet formed from the resin composition according to claim 1.

10. A tube formed from the resin composition according to claim 1.

11. The resin composition according to claim 1, wherein the content of the conjugated diene monomer units including hydrogenated conjugated diene monomer units in each of the hydrogenated polymer blocks $HD^a$ and $HD^b$ is 80% by weight or more by weight in the total conjugated diene polymer block, and the conjugated diene monomer units are isoprene units.

12. The resin composition according to claim 1, wherein the weight average molecular weight of $Ar1^a$ $(Mw(Ar1^a))$ is 2,000 to 40,000.

13. The resin composition according to claim 1, wherein the weight average molecular weight of $Ar2^a$ $(Mw(Ar2^a))$ is 5,000 to 250,000.

* * * * *